United States Patent [19]

Suzuki et al.

[11] 3,929,765
[45] Dec. 30, 1975

[54] NOVEL 3-SUBSTITUTED-AMINOAZETIDINE DERIVATIVES AND PROCESS FOR PREPARATION THEREOF

[75] Inventors: Yasushi Suzuki, Yokohama; Yukio Hasegawa, Kawasaki; Kunio Tsukamoto, Tokyo; Yoshio Hiramatsu; Katsuhiko Miyasaka, both of Kawasaki, all of Japan

[73] Assignee: Teikoku Hormone Mfg. Co. Ltd., Tokyo, Japan

[22] Filed: Aug. 18, 1972

[21] Appl. No.: 281,804

[30] Foreign Application Priority Data
Aug. 21, 1971 Japan.................................. 46-63722

[52] U.S. Cl.... 260/239 A; 260/250 A; 260/256.4 C; 260/256.4 R; 260/288 R; 260/296 R; 260/309; 260/326.15; 260/346.2 M; 260/563 R; 260/570.5 R; 260/570.5 C; 260/570.5 S; 260/570.5 P; 424/244
[51] Int. Cl.².......................................... C07D 205/04
[58] Field of Search................................ 260/239 A

[56] References Cited
UNITED STATES PATENTS
3,481,920  12/1969  Hargrove......................... 260/239 A

*Primary Examiner*—Paul M. Coughlan, Jr.
*Assistant Examiner*—Mary C. Vaughn
*Attorney, Agent, or Firm*—Sherman & Shalloway

[57] ABSTRACT

This invention provides novel 3-substituted-aminoazetidine derivatives expressed by the following general formula:

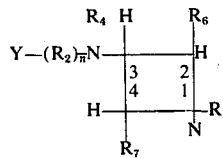

and their ammonium salts.

These azetidine derivatives and ammonium salts exhibit pharmaceutical effects and are excellent as analgesics and/or anti-inflammatory agents.

9 Claims, No Drawings

NOVEL 3-SUBSTITUTED-AMINOAZETIDINE DERIVATIVES AND PROCESS FOR PREPARATION THEREOF

This invention relates to novel compounds which have analgesic and anti-inflammatory activities and are valuable in the medicinal field, and a process for the preparation thereof.

It has been known that a 3-guanidyl-substituted-azetidine derivative expressed by the following formula

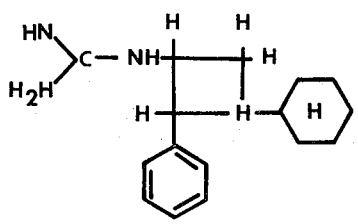

has a hypotensive activity.

This invention relates to novel 3-substituted-aminoazetidine derivatives expressed by the following general formula:

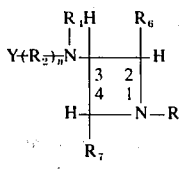

wherein
R stands for a hydrogen atom, an aliphatic, alicyclic or aromatic hydrocarbon residue or a hydrocarbon residue containing a heteroatom, $R_4$ is a hydrogen atom, a saturated or unsaturated aliphatic hydrocarbon group, an acyl group, an alkoxycarbonyl group or an aryl group; $R_2$ is an alkylene group which may be branched, $n$ is an integer of 0 or 1, and when n is 0, $Y(R_2)_n$ stands for Y—; Y designates a group

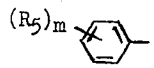

in which $R_5$ is selected from hydrogen and halogen atoms and nitro, nitrile, alkyl, haloalkyl, alkoxy, alkoxycarbonyl, carboxyl sulfamoyl, acyl, phenyl, phenylalkyl and phenylthio groups, $m$ is 1, 2 or 3, and when m is 2 or 3, two or three $R_5$'s may be the same or different or two of two or three $R_5$'s may form together an alkylene or alkenylene group which may be substituted, or Y designates a 5- to 13-membered heterocyclic hydrocarbon group which contains a heteroatom selected from the group consisting of oxygen, nitrogen and sulfur atoms and which may be substituted; and $R_6$ and $R_7$, which may be the same or different, stand for a member selected from the group consisting of hydrogen, alkyl groups, cycloalkyl groups and aryl groups;

and their ammonium salts in which ammonium salts are located at the 1-position and/or the 3-substituted-N-position. The invention relates also to a process for the preparation of said azetidine derivatives and their ammonium salts.

Novel azetidine derivatives of this invention expressed by above formula (1) and their ammonium salts in which ammonium salts are located at the 1-position and/or the 3-substituted-N-position have excellent analgesic and anti-inflammatory activities.

Further, novel azetidine derivatives of this invention expressed by the above formula (1) and their ammonium salts can readily be formed into substituted ethylenediamine derivatives expressed by the following formula

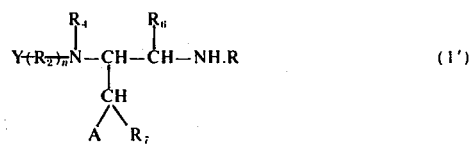

when they are treated with, for instance, a mineral acid or organic acid (HA). These substituted ethylenediamine derivatives are also valuable as medicines for remedy of heart diseases, antihistamines, tranquilizers such as thymoleptic agents, anti-seasickness or anti-motionsickness agents, and antiemetics. Accordingly, the novel 3-substituted-amino-azetidine derivatives of this invention expressed by the above formula (1) and their ammonium salts are valuable not only as analgesic and anti-inflammatory agents but also as intemediates for synthesis or other medicines.

Accordingly, it is a primary object of this invention to provide novel 3-substituted-aminoazetidine derivatives expressed by the above formula (1) and their ammonium salts, which are valuable as medicines and intermediates leading to medicines.

Another object of this invention is to provide a process for the preparation of such novel azetidine derivatives and ammonium salts thereof.

Other objects and advantages of this invention will be apparent from description given herebelow.

Novel 3-substituted-aminoazetidine derivatives expressed by the above formula (1) and their ammonium salts in which ammonium salts are located at the 1-position and/or the 3-substituted-N-position may be prepared by reacting a 3-substituted-azetidine derivative expressed by the following formula

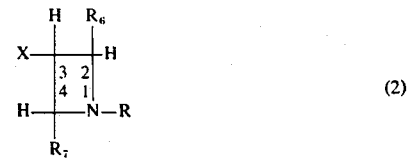

wherein X stands for a reactive acid residue, R is a hydrogen atom, an aliphatic, alicyclic or aromatic hydrocarbon residue or a hydrocarbon residue containing a heteroatom, and $R_6$ and $R_7$, which may be the same or different, stand for hydrogen, an alkyl group, a cycloalkyl group or an aryl group, or an ammonium salt thereof in which the ammonium salt is located at the 1-position, with a compound expressed by the following formula

wherein R₂ is an alkylene group which may be branched, n is an integer of 0 or 1, when n is O, Y(R₂)ₙ stands for Y—, R₃ is a hydrogen atom or alkali metal, R₄ is a hydrogen atom, a saturated or unsaturated aliphatic hydrocarbon group, an acyl group, an alkoxycarbonyl group or an aryl group, and Y designates a group

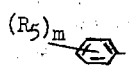

in which R₅ is selected from hydrogen and halogen atoms and nitro, nitrile, alkyl, haloalkyl, alkoxycarbonyl, carboxyl, sulfamoyl, acyl, phenyl, phenylalkyl and phenylthio groups, m is 1, 2 or 3, and when m is 2 or 3, two or three R₅'s may be the same or different or two or three R₅'s may form together an alkylene or alkenylene group which may be substituted, or Y designates a 5- to 13-membered heterocyclic hydrocarbon group which contains a heteroatom selected from the group consisting of oxygen, nitrogen and sulfur atoms and which may be substituted, with the proviso that X— on the compound of the above formula (2) may be interchanged with —R₃ (only when R₃ stands for an alkali metal) or

on the compound of formula (3), under such conditions as will split off R₃X in which X and R₃ are as defined above, thereby to form a compound expressed by the above formula (1), and when R₄ on the resulting compound of the above formula (1) is a hydrogen atom, converting if desired, the said hydrogen atom to a saturated or unsaturated aliphatic hydrocarbon residue, an acyl group, an alkoxycarbonyl group or an aryl group according to a method known per se, and further, if desired, converting the resulting compound to an ammonium salt in which ammonium salts are located at the 1-position and/or the 3-substituted-N-position in the above formula (1).

Thus, in accordance with this invention 3-substituted-aminoazetidine derivatives of the above formula (1) and their ammonium salts may be prepared not only by a method comprising reacting a compound of the above formula (2) or its ammonium salt with a compound of above formula (3) or its ammonium salts, but also by the following methods. Namely, 3-substituted-aminoazetidine derivatives of the above formula (1) and their ammonium salts may be prepared by a method comprising reacting compounds in which -X on the above formula (2) and —R₃ (only in case R₃ stands for an alkali metal) or

on the above formula (3) are interchanged with each other, i.e., a method comprising reacting a compound expressed by the following formula

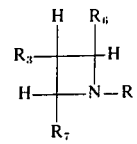
(2-1)

wherein R₃ stands for an alkali metal, and R, R₆ and R₇ are as defined above, with a compound expressed by the following formula

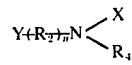
(3-1)

wherein X, R₂, n and R₄ are as defined above, or by a method comprising reacting a compound expressed by the following formula

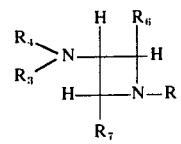
(2-2)

wherein R, R₃, R₄, R₆ and R₇ are as defined above, with a compound expressed by the following formula

(3-2)

wherein X, R₂ and n are as defined above.

In each of the above-mentioned methods, if R₄ on the above formula (1) is a hydrogen atom in the resulting compound, it is possible to convert the said hydrogen atom to a saturated or unsaturated aliphatic hydrocarbon residue, an acyl group, an alkoxycarbonyl group or an aryl group. Further, if desired, the nitrogen atom at the 1-position or the nitrogen atom substituted at the 3-position in the resulting compound of formula (1) may be converted to an ammonium salt form.

In case compounds of this invention expressed by the above formula (1) are 3-substituted-azetidine derivatives of the following general formula or their ammonium salts in which ammonium salts are located at the 1-position and/or the 3-substituted-N-position

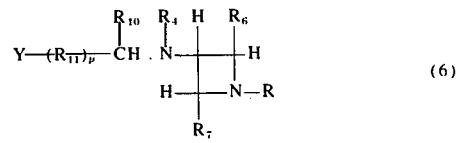
(6)

wherein R₁₀ stands for a hydrogen atom or a lower alkyl group, R₁₁ is an alkylene group, p is an integer of 0 or 1 and when p is O, Y(R₁₁)ₚ stands for —Y, and R, R₄, R₆, R₇ and Y are as defined above, they may be prepared also by a method comprising reacting a 3-substituted-aminoazetidine derivative expressed by the following formula

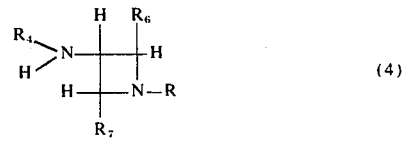
(4)

wherein R stands for a hydrogen atom, an aliphatic, alicyclic or aromatic hydrocarbon residue or a hydrocarbon residue containing a heteroatom, $R_6$ and $R_7$, which may be the same or different, stand for hydrogen, an alkyl group, a cycloalkyl group, or an aryl group, and $R_4$ designates a hydrogen atom, a saturated or unsaturated aliphatic hydrocarbon group, an acyl group, an alkoxycarbonyl group or an aryl group,
or its ammonium salt in which the ammonium salt is located at the 1-position, with a compound expressed by the following formula

 (5)

wherein $R_{10}$ is a hydrogen atom or a lower alkyl group, $R_{11}$ is an alkylene group, $p$ is an integer of 0 or 1 and when $p$ is 0, $Y(R_{11})_p$ stands for —Y, and Y designates a group

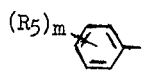

in which $R_5$ is selected from hydrogen and halogen atoms and nitro, nitrile, alkyl, haloalkyl, alkoxy, alkoxycarbonyl, carboxyl, sulfamoyl, acyl, phenyl, phenylalkyl and phenylthio groups, $m$ is 1, 2 or 3, and when $m$ is 2 or 3, two or three $R_5$'s may be the same or different or two of two or three $R_5$'s may forth together an alkylene or alkenylene group which may be substituted, or Y designates a 5- or 13-membered heterocyclic hydrocarbon group which contains a heteroatom selected from the group consisting of oxygen, nitrogen and sulfur atoms and which may be substituted,
under dehydrating conditions, and conducting the reduction simultaneously with or in succession to the above reaction.

In case of the compound of the above formula (6) obtained by the reaction between the compounds of above formulas (4) and (5) or their ammonium salts $R_4$ is a hydrogen atom, it is possible to convert, as in the above-mentioned methods, the said hydrogen atom to a saturated or unsaturated aliphatic hydrocarbon residue, an acyl group, an alkoxycarbonyl group or an aryl group by a method known per se. It is also possible to convert the nitrogen atom at the 1-position and/or the nitrogen atom at the 3-substituted-N-position to ammonium salts.

Compounds expressed by the following formula

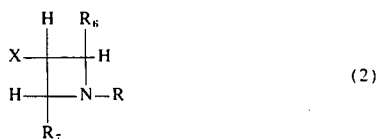 (2)

wherein R, $R_6$, $R_7$ and X are as defined above,
are used as one reactant for the preparation of 3-substituted-aminoazetidine derivatives expressed by the above formula (1) and their ammonium salts. As X is mentioned on the above formula, there may be employed any of reactive acid residues that can react with a hydrogen atom or alkali metal expressed as $R_3$ in the above formula (3) to split off $R_3X$. Typical instances of X are halogen atoms such as chlorine and bromine, organic sulfur-oxygenacid residues such as organic sulfonic acid residues, organic sulfinic acid residues and organic sulfenic acid residues, and organic phosphorus-oxygenacid residues such as organic phosphonic acid residues and organic phosphinic acid residues.

Such compounds of the above formula (2) may be prepared, for instance, by dissolving a 3-azetidinol derivative expressed by the following formula

 (7)

wherein R stands for a hydrogen atom, an aliphatic, alicyclic or aromatic hydrocarbon residue or a hydrocarbon residue containing a heteroatom, and $R_6$ and $R_7$, which may be the same or different, stand for a hydrogen atom, an alkyl group, a cycloalkyl group or an aryl group,
in an organic base such, for example, as pyridine and triethylamine, and reacting it with an alkylsulfonyl chloride or a arylsulfonyl chloride which may be substituted.

In the reaction between the azetidinol derivative of the above formula (7) and the alkyl- or aryl-sulfonyl chloride, in case R is a hydrogen atom, depending on the reaction conditions not only the hydroxyl group at the 3-position but also the hydrogen atom at the 1-position is sometimes substituted by the alkyl- or aryl-sulfonyl group. In such case, it is possible to obtain a compound of the above formula (1) in which R is a hydrogen atom by reacting, as mentioned above, the alkyl- or aryl-sulfonyl group at the 3-position with a compound of formula (3) and splitting off the alkyl- or aryl-sulfonyl group by selective hydrolysis.

Among the compounds of the above formula (2), those in which X is a halogen atom may be prepared by halogenating a compound of the above formula (7) with an ordinary halogenating reagent. For instance, these compounds may be prepared by contacting a compound of the above formula (7) with a halogenating reagent such as thionyl halides, phosphorus oxyhalides and phosphorus trihalides in the presence or absence of an inert organic solvent such as chloroform and carbon tetrachloride. This reaction is allowed to advance at room temperature and heating need not be effected. However, if desired, it is permissible to conduct the reaction at an elevated temperature not exceeding about 40°C. In addition to the above halogenation reaction, halogenation of a compound of the above formula (7) with triphenylphosphine and carbon tetrachloride at room temperature or under heating conditions is also possible and preferred. In this halogenation reaction, it is preferable to adopt an elevated temperature, for instance, ranging from 40°C. to the boiling point of carbon tetrachloride.

Still further, a compound of the above formula (7) may be prepared according to the reaction expressed by the following reaction formula

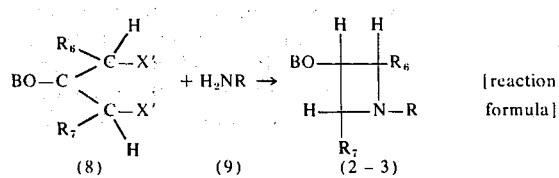

More specifically, it may be prepared by reacting a 1,3-dihalo-2-propanol derivative of the above formula (8) with a primary amine or its acid salt expressed by the above formula (9) in an inert organic solvent, water or a mixture thereof at an elevated temperature under pressure. $R_6$ and $R_7$ mentioned on above formulas (8) and (2-3) are as defined above with respect to formula (2), and B stands for a hydrogen atom or a protective group such as acyl, alkoxyalkyl and aralkyl groups. R mentioned on the above formulas (9) and (2-3) is as defined above with respect to the above formula (2) or (1), and X' stands for a halogen atom. In case B is a protective group such as mentioned above, the compound of above formula (2-3) may be hydrolyzed or reduced to convert the group B into a hydroxyl (—OH) group. Thus, a compound of the above formula (7) is obtained.

As described above, novel 3-substituted-aminoazetidine derivatives of this invention expressed by the above general formula (1) and their ammonium salts may be prepared by reacting a 3-substituted-azetidine derivative of the following formula

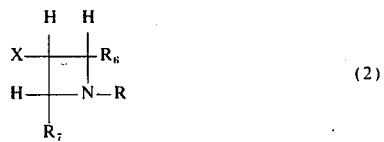

wherein R, $R_6$, $R_7$ and X are as defined above.
with a compound expressed by the following formula

wherein $R_2$, $n$, $R_3$, $R_4$ and Y are as defined above, under such conditions as will split off $R_3X$.

It is preferred that the reaction between the compound of the above formula (2) and the compound of the above formula (3) is conducted in the presence of an inert organic solvent. In case $R_3$ mentioned on the above formula (3) is a hydrogen atom, water and aqueous solvents may be used, but it is preferred that organic solvents are used whether $R_3$ on the above formula (3) is a hydrogen atom or an alkali metal. As such solvent there may be mentioned aliphatic alcohols, ketones, ethers, aliphatic or aromatic hydrocarbons, organic amines, etc. Specific examples of such organic solvents are lower aliphatic alcohols having 1 to 4 carbon atoms such as methanol, ethanol and propanol; ethers such as diethylether, dioxane, dimethoxyethane and tetrahydrofuran; ketones such as acetone and methylethylketone; aliphatic and aromatic hydrocarbons such as cyclohexane and benzene; and organic bases such as dimethylformamide, pyridine and triethylamine.

This reaction can be accomplished merely by contacting the compound of above formula (2) with the compound of the above formula (2). Heating or cooling need not be effected especially, and the reaction is allowed to advance at room temperature. If desired, however, it is possible to adopt cooling or heating conditions. For instance, temperatures ranging from 0° to 60°C. are preferably adopted. It is preferred that the reaction is carried out in the absence of light or molecular oxygen. Thus, it is advantageous to conduct the reaction in an atmosphere of nitrogen or other inert gas. The reaction time may be varied appropriately depending on the presence or absence of a solvent, the kind of a solvent, the reaction temperature, kinds of reactants, and other factors. In general, the reaction is carried out for 5 to 50 hours.

It is possible to conduct the above reaction in the presence of a deacidifying agent. As such deacidifying agent, there may be exemplified inorganic bases such as alkali metal hydroxides, alkali metal carbonates and alkali metal bicarbonates, organic bases also usable as solvents such as triethylamine and pyridine, and anion-exchange resins.

Proportions of compounds of formulas (2) and (3) to be used are not particularly critical, and they may be varied optionally. In general, the reaction is carried out by employing compounds of formulas (2) and (3) in equimolar amounts, but it is possible to employ the amine derivative of the above formula (3) in molar excess.

The resulting reaction mixture is concentrated by distillation of the solvent in case the reaction is carried out in the presence of the solvent, and it is treated with a water-immiscible organic solvent. In case the reaction is carried out in the absence of a solvent, thus prepared reaction mixture is directly treated with such water-immiscible organic solvent. Then, an aqueous alkali solution is added to the mixture, followed by sufficient agitation, and the organic solvent layer is collected. Then, the solvent is removed by distillation, for example, under reduced pressure to recover the intended product. The so recovered product may be purified by recrystallization, distillation or chromatography, if desired.

Novel 3-substituted-aminoazetidine derivatives of this invention expressed by the above general formula (1) and their ammonium salts may be prepared, as mentioned above, by reacting a compound of the following formula

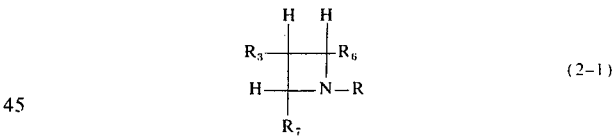

wherein $R_3$ is an alkali metal, and R, $R_6$ and $R_7$ are as defined above,
with a compound of the following formula

wherein $R_2$, $n$, $R_4$, X and Y are as defined above, while splitting off $R_3X$, or by reacting a compound of the following formula

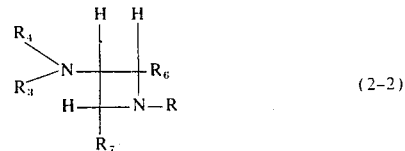

wherein R, $R_3$, $R_4$, $R_6$ and $R_7$ are as defined above, with a compound of the following formula

wherein $R_2$, $n$, X and Y are as defined above, while splitting off $R_3X$. These reactions may be carried out under similar conditions to those mentioned above with respect to the reaction between compounds of formulas (2) and (3).

Preferable examples of X have already been mentioned with respect to compounds of formula (2). As R on above formula (2), (2-1) or (2-2), any of aliphatic, alicyclic or aromatic hydrocarbon residues and heteroatom-containing hydrocarbon residues may be used as far as it is inactive and stable under the conditions for reaction between compounds of above formula (2), (2-1) or (2-2) and compounds of above formula (3), (3-1) or (3-2) for splitting off $R_3X$. In view of pharmaceutical effects of the compounds of this invention expressed by the above formula (1), it is preferred that such hydrocarbon residue is selected from alkyl groups of 1 to 4 carbon atoms, alkyl groups of 1 to 4 carbon atoms substituted by one or two phenyl groups which may be substituted and cycloalkyl groups of up to 6 carbon atoms. Preferable examples of the heteroatom-containing hydrocarbon residue are 5- or 6-membered rings containing nitrogen (N), sulfur (S) or oxygen (O). These heteroatom-containing hydrocarbon residues may be bonded directly or through a hydrocarbon group to the nitrogen atom (N) at the 1-position of the azetidine ring. In view of pharmaceutical effects of compounds of the above formula (1), $\alpha$-picolyl, $\beta$-picolyl, furfuryl, indol-3-ylethyl and piperidin-1-ylmethyl groups are preferred as such heteroatom-containing hydrocarbon residue as R. The heteroatom-containing hydrocarbon residue as R includes not only heterocyclic rings such as mentioned above, but also other atomic groups containing a heteroatom in the molecule. For instance, there may be employed heteroatom-containing hydrocarbon residues which are ordinarily employed as protective groups capable of being split off by hydrolysis or reduction, such, for example, as acyl groups, e.g., carbobenzoxy, acetyl, propionyl and benzoyl groups; and mesyl, tosyl and sulfanyl groups. Still further, R may be such protective hydrocarbon groups as benzyl, triphenylmethyl and benzhydryl (diphenylmethyl) groups.

In case R is a protective group such as exemplified above, after formation of a compound of above formula (1) by reacting, for example, a compound of above formula (2) with a compound of above formula (3), such protective group is split off according to a technique known per se (R is converted to a hydrogen atom), and then a desired group may be introduced into the nitrogen atom of the 1-position of the azetidine ring.

As mentioned above, $R_4$ on above formula (3) stands for a hydrogen atom, a substituted or unsubstituted aliphatic hydrocarbon group, an acyl group, an alkoxycarbonyl group or an aryl group. The saturated or unsaturated hydrocarbon group referred to herein includes alkyl groups such as methyl, ethyl, n-propyl, isopropyl, n-butyl, sec-butyl and tert.butyl groups, and alkenyl groups such as vinyl and allyl groups. The acyl group used herein is an acyl group interpreted in a broad sense, and preferable examples of the acyl group are acetyl, propionyl, benzoyl, cinnamoyl and p-toluenesulfonyl groups. As the alkoxycarbonyl group as $R_4$, there may be mentioned, for example, methoxycarbonyl, ethoxycarbonyl and tert.-butoxycarbonyl groups. As the aryl group as $R_4$ there may be exemplified a phenyl group which may be substituted by a halogen atom, a lower alkyl group, a lower alkoxy group or a lower alkoxycarbonyl group.

In compounds expressed by the following formula

  (3)

the definitions of $R_2$, n, $R_3$, $R_4$ and Y are as mentioned above. In view of readiness for synthesis of compounds of above formula (3) and intended compounds of above formula (1), among compounds expressed by the above formula (3) especially preferred are those in which $R_2$ is a straight or branched alkyl group of 1 to 4 carbon atoms, n is 0 or 1, Y is a group

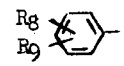

in which $R_8$ and $R_9$, which may be the same or different, stand for a hydrogen atom, an alkyl group of 1 to 4 carbon atoms, a lower alkoxy group, lower alkoxycarbonyl group, a carboxyl group or a halogen atom (especially a chlorine atom), and $R_4$ is a hydrogen atom, a saturated or unsaturated alkyl group of 1 to 4 carbon atoms, a cycloalkyl group of 3 to 7 carbon atoms, an alkylcarbonyl group of 1 to 4 carbon atoms, an alkoxycarbonyl group of 1 to 4 carbon atoms, or a phenyl group which may be substituted by a group as mentioned above.

In the above formula (3), not only hydrogen but also an alkali metal such as lithium, sodium and potassium is preferable as $R_3$, and preferable examples of $R_4$ are a hydrogen atom, an alkyl group of 1 to 4 carbon atoms, an allyl group, an alkylcarbonyl group of 1 to 4 carbon atoms, an alkoxycarbonyl group of 1 to 4 carbon atoms, and a phenyl group substituted by an alkyl or alkoxycarbonyl group such as mentioned above.

In case Y mentioned on the above formula (3) stands for a group

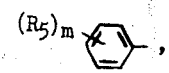

the acyl group mentioned as a substituent on the benzene nucleus is one used in a broad sense. For instance, a benzoyl group is preferred. Further, the benzene nuclei of the phenyl, phenylalkyl and phenylthio groups as mentioned $R_5$ may be substituted by an optional group being stable and inactive under the reaction conditions, such as a halogen atom, a nitro group, an alkyl group, an alkoxy group, etc. In case m is 2 or 3, two of two or three $R_5$'s may be bonded together to form an alkylene or alkenylene group which may be substituted, and they may form, together with the phenyl group to which they are attached, a group

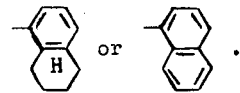

In this case, such tetrahydronaphthalene or naphthalene nucleus may further be substituted by a group being stable and inreactive under the reaction conditions, such as a halogen atom, a nitro group, an alkyl group and an alkoxy group.

In case Y is a heterocyclic hydrocarbon group containing a heteroatom, preferable examples of Y are pyridine, pyridazine, pyrimidine, quinoline, benzofuran, N-substituted-indole, N-substituted-benzimidazole, etc.

In compounds in which X on above formula (2) is interchanged with $R_3$ on above formula (3) ($R_3$ is an alkali metal) or

on above formula (3), namely in the compounds of formula (2-1) or (2-2) and compounds of formula (3-1) or (3-2), preferable examples of $R_3$, $R_4$, $R_2$ and Y are as mentioned hereinabove with respect to compounds of above formula (1) and (2).

Several specific examples of compounds expressed by formulas (2) and (3) will now be illustrated.

Specific Examples of Compounds of Formula (2)

(1) 3-Methanesulfonyloxy-1-isopropylazetidine
(2) 3-Chloro-1-isopropylazetidine
(3) 3-Bromo-1-isopropylazetidine
(4) 3-Methanesulfonyloxy-1-tert-butylazetidine
(5) 3-p-Toluenesulfonyloxy-1-tert-butylazetidine
(6) 3-Chloro-1-tert-butylazetidine
(7) 3-Bromo-1-tert-butylazetidine
(8) 3-Methanesulfonyloxy-1-methylazetidine
(9) 3-Methanesulfonyloxy-1-ethylazetidine
(10) 3-Methanesulfonyloxy-1-cyclohexylazetidine
(11) 3-Chloro-1-cyclohexylazetidine
(12) 3-Methanesulfonyloxy-1-cyclopentylazetidine
(13) 3-Chloro-1-cyclopentylazetidine
(14) 3-Chloro-1-sec-butylazetidine
(15) 3-Chloro-1-isopropyl-2-methylazetidine
(16) 3-Methanesulfonyloxy-1-ethyl-2-phenylazetidine
(17) 3-Methanesulfonyloxy-1-methyl-2-ethylazetidine
(18) 3-Methanesulfonyloxy-1-n-propyl-2-cyclohexylazetidine
(19) 3-Methanesulfonyloxy-1-n-butyl-2-methylazetidine
(20) 3-Methanesulfonyloxy-1-sec-butyl-2-phenylazetidine
(21) 3-Methanesulfonyloxy-1-tert-butyl-2-cyclohexylazetidine
(22) 3-Methanesulfonyloxy-1-phenetylazetidine
(23) 3-Toluenesulfonyloxy-1-tert-butyl-2,4-dimethylazetidine
(24) 3-Iodo-1-α-picolylazetidine
(25) 3-Chloro-1-β-picolylazetidine
(26) 3-Bromo-1-α-picolyl-2-methylazetidine
(27) 3-Bromo-1-indolylethylazetidine
(28) 3-Methanesulfonyloxy-1-piperidylmethylazetidine
(29) 3-Methanesulfonyloxy-1-(2-imidazolylmethyl)azetidine
(30) 3-Methanesulfonyloxy-1-furfurylazetidine
(31) 3-Methanesulfonyloxy-1-benzyloxycarbonylazetidine
(32) 3-Chloro-1-benzhydrylazetidine
(33) 3-Bromo-1-toluenesulfonylazetidine
(34) 3-Methanesulfonyloxy-1-sulfanylazetidine
(35) 3-Chloro-1-benzoylazetidine
(36) 3-Bromo-1-acetyl-2-methylazetidine Specific Examples of Compounds of Formula (3)

(37) Aniline
(38) N-methylaniline
(39) N-ethylaniline
(40) N-n-propylaniline
(41) N-n-butylaniline
(42) N-sec-butylaniline
(43) N-allylaniline
(44) Benzylamine
(45) N-methylbenzylamine
(46) m-Anisidine
(47) o-Anisidine
(48) p-Anisidine
(49) m-Phenetidine
(50) o-Toluidine
(51) β-Phenylpropylamine
(52) β-Phenylethylamine
(53) m-Toluidine
(54) p-Trifluoromethylbenzylamine
(55) 3,4,5-Trimethoxybenzylamine
(56) 3,4-Dimethoxybenzylamine
(57) 3,4,5-Trimethoxyaniline
(58) 3,4-Dimethoxyaniline
(59) p-Nitroaniline
(60) m-Nitroaniline
(61) Methyl anthranilate
(62) Ethyl anthranilate
(63) Methyl 2-methoxy-4-aminobenzoate
(64) Methyl N-methylanthranilate
(65) Ethyl N-ethylanthranilate
(66) 2-Aminopyridine
(67) 2-Amino-α-picoline
(68) p-Chloroaniline
(69) m-Chloroaniline
(70) o-Chloroaniline
(71) Acetanilide
(72) Propionanilide
(73) N-ethoxycarbonylaniline
(74) N-methoxycarbonylaniline
(75) N-propyloxycarbonylaniline
(76) N-cyclohexylaniline
(77) N-ethylbenzylamine
(78) p-Nitrobenzylamine
(79) p-Nitrophenethylamine
(80) N-methyl-p-nitrobenzylamine
(81) N-methyl-p-nitrophenethylamine
(82) N-ethyl-p-nitrobenzylamine
(83) N-ethyl-p-nitrophenethylamine
(84) Benzanilide
(85) Diphenylamine
(86) N-phenylbenzylamine
(87) N-allylbenzylamine
(88) N-phenethylbenzylamine
(89) Sodium N-methyl-N-p-nitrobenzylamide

(90) Sodium N-methyl-N-p-nitrophenethylamide
(91) Sodium N-ethyl-N-p-nitrobenzylamide
(92) Sodium N-ethyl-N-p-nitrophenethylamide
(93) Sodium N-methylanilide
(94) Sodium N-phenethyl-N-benzylamide
(95) Sodium N-allylanilide
(96) Sodium N-ethylanilide
(97) Sodium N-methyl-N-o-methoxycarbonylanilide
(98) Lithium N-methyl-N-p-nitrobenzylamide
(99) Lithium N-methyl-N-p-nitrophenethylamide
(100) Lithium N-allylanilide
(101) Lithium N-phenethyl-N-benzylamide
(102) Cinnamanilide
(103) Phenylacetanilide
(104) Phenylpropionanilide
(105) N-phenylacetyl-p-nitroaniline
(106) N-phenylpropionyl-p-nitroaniline Since compounds of formulas (2-1) and (2-2) and compounds of formulas (3-1) and (3-2) are interchanged modifications of compounds of formulas (2) and (3), specific examples of compounds of formulas (2-1), (2-2), (3-1) and (3-2) will readily be understood from specific examples of compounds of formulas (2) and (3) illustrated above. Accordingly, only typical examples of these compounds are illustrated below.

Specific Examples of Compounds of Formula (2-1)

(107) 1-Isopropyl-3-azetidinyl lithium
(108) 1-Ethyl-2,4-dimethyl-3-azetidinyl lithium
(109) 1-Tert-butyl-2-cyclohexyl-3-azetidinyl potassium
(110) 1-Cyclohexyl-2-phenyl-3-azetidinyl lithium
(111) 1-Methyl-3-azetidinyl lithium
(112) 1-Phenethyl-3-azetidinyl sodium
(113) 1-α-Picolyl-3-azetidinyl lithium
(114) 1- β-(1-Methylindol-3'-yl)ethyl -3-azetidinyl potassium
(115) 1-Furfulyl-2-methyl-3-azetidinyl sodium
(116) 1-Benzoyl-3-azetidinyl lithium Specific Examples of Compounds of Formula (2-2)

(117) 1-Isopropyl-3-benzylaminoazetidine
(118) 1-t-Butyl-3-phenylaminoazetidine
(119) 1-Cyclohexyl-3-phenylaminoazetidine
(120) 1-Isopropyl-2-methyl-3-phenylaminoazetidine
(121) 1-Isopropyl-2-cyclohexyl-3-phenylaminoazetidine
(122) 1-t-butyl-2-phenyl-3-benzylaminoazetidine
(123) Sodium N(1-isopropyl-2-methyl-3-azetidinyl)anilide
(124) Potassium N(1-isopropyl-2-cyclohexyl-3-azetidinyl)anilide
(125) Lithium N(1-t-butyl-2-cyclohexyl-3-azetidinyl)benzylamide Specific Examples of Compounds of Formula (3-1)

(126) N-bromoaniline
(127) N-chlorobenzylamine
(128) N-chlorophenethylamine
(129) N-bromo-o-methoxycarbonylaniline
(130) N-bromo-o-methoxycarbonylbenzylamine Specific Examples of Compounds of Formula (3-2)

(131) Bromobenzene
(132) Benzylchloride
(133) Phenethylbromide
(134) Methyl o-bromobenzoate Acids capable of forming an ammonium salt on the nitrogen atom at the 1-position of a compound of the above formula (2), (2-1) or (2-2), or on the nitrogen atom of the 3-substituted-amino group of a compound of the above formula (3), (3-1) or (3-2) include, for example, hydrochloric acid, hydrobromic acid, toluenesulfonic acid, methyl iodide, ethyl bromide, n-butyl bromide, isoamyl bromide, etc.

In case compounds of the above formula (1) are those expressed by the following formula

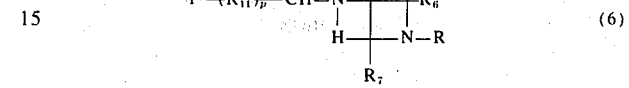

wherein R stands for a hydrogen atom, an aliphatic, alicyclic or aromatic hydrocarbon residue, or a hydrocarbon residue containing a heteroatom, $R_4$ stands for a hydrogen atom, a saturated or unsaturated aliphatic hydrocarbon residue, an acyl group, an alkoxycarbonyl group or an aryl group, $R_6$ and $R_7$, which may be the same or different, stands for a hydrogen atom, an alkyl group, a cycloalkyl group or an aryl group, $R_{10}$ is a hydrogen atom or a lower alkyl group, $R_{11}$ is an alkylene group, p is 0 or 1 and when p is 0, $Y\text{-}(R_{11})_p$ stands for $Y-$, and Y is as defined above with respect to the above formula (2) or (1), these compounds of the above formula (6) may be prepared by reacting a 3-substituted-aminoazetidine derivative expressed by the following formula

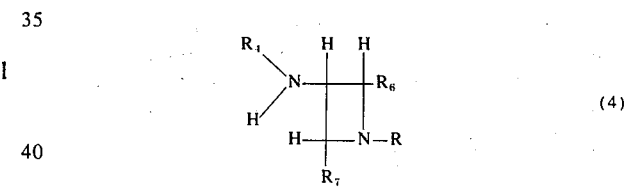

wherein R, $R_4$, $R_6$ and $R_7$ are as defined above, or an ammonium salt thereof in which the ammonium salt is formed at the 1-position, with a compound expressed by the following formula

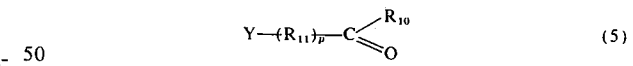

wherein $R_{10}$, $R_{11}$, p and Y are as defined above, under dehydrating conditions, and conducting the reduction simultaneously with or in succession to the above reaction.

In case $R_4$ of so-formed compounds of the above formula (6) is a hydrogen atom, the said hydrogen atom may be, if desired, converted to a saturated or unsaturated aliphatic hydrocarbon residue, an acyl group, an alkoxycarbonyl group or an aryl group by a method known per se. Further, if desired, the nitrogen atom at the 1-position of the resulting 3-substituted-aminoazetidine derivative and/or the nitrogen atom at the 3-substituted-N-position of said derivative may be converted to ammonium salts. Thus, various compounds expressed by the above formula (1) and ammonium salts thereof may be prepared starting from compounds expressed by the above formula (4) and (5).

Preferable examples of $R$, $R_6$, $R_7$ and $R_4$ on compounds of the above formula (4) are as illustrated hereinabove with respect to formulas (2) and (2-1).

In compounds of the above formula (5), a hydrogen atom and a methyl group are preferable as $R_{10}$ and a hydrogen atom is especially preferable. As $R_{11}$ is preferred a straight or branched alkylene group of 1 to 3 carbon atoms. Preferable examples of Y are those as mentioned hereinabove with respect to formulas (3) and (1).

Compounds of the above formula (6) may be prepared, for instance, by reacting a compound of the above formula (4) with a compound of formula (5) in the presence of hydrogen in the presence or absence of an inert organic solvent also in the presence of a hydrogenation catalyst.

As such inert organic solvent there may be mentioned, for example, alcohols such as methanol and ethanol, aliphatic hydrocarbons such as n-pentane and n-hexane, alicyclic hydrocarbons such as cyclopentane and cyclohexane, ethers such as ethyl ether, butyl ether, tetrahydrofuran, dimethoxyethane and dioxane, aromatic hydrocarbons such as benzene and toluene, esters such as ethyl acetate and butyl acetate, and amides such as formamide, dimethylformamide and dimethylacetamide.

Noble metal catalysts such as platinum, palladium, nickel, etc. are preferably used as a hydrogenation catalyst. It is desired that the reaction is carried out in the presence of such hydrogenation catalyst under a hydrogen partial pressure of atmospheric pressure to 50 Kg/cm² at a temperature ranging from room temperature to 60°C. Thus, compounds of above formula (6) can be formed.

Still further, novel 3-substituted-aminoazetidine derivatives of this invention expressed by above general formula (1) and ammonium salts thereof may be prepared by (i) reacting a compound expressed by the following formula

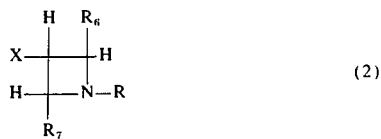
(2)

wherein $R$, $R_6$, $R_7$ and $Y$ are as defined above,
or its ammonium salt in which the ammonium salt is located at the 1-position with a compound expressed by the following formula

(3-1)

wherein $R_2$, $R_4$, $X$, $Y$ and $n$ are as defined above,
in the presence of a di- or tri-valent metal by procedures known per se, or (ii) reacting an interchange compound of the above formula (2) in which X is exchanged with

of the above formula (3-1), i.e., a compound expressed by the following formula

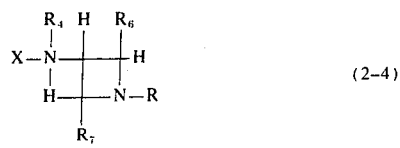
(2-4)

wherein $R$, $R_4$, $R_6$, $R_7$ and $X$ are as defined above, or its ammonium salt in which the ammonium salt group is located at the 1-position with an interchange compound of above formula (3-1) in which

of above formula (3-1) is exchanged with X of above formula (2), i.e., a compound expressed by the following formula

(3-2)

wherein $R_2$, X, Y and are as defined above,
in the presence of a di- or tri-valent metal by procedures known per se.

The reaction between the compound of above formula (2) and the compound of the above formula (3-1) or between the compound of above formula (2-4) and the compound of above formula (3-2) is carried out under anhydrous conditions in a non-polar organic solvent in the presence of powder, foil or thin flake of the above-mentioned di- or tri-valent metal.

As such non-polar solvent there may be mentioned, for example, benzene, n-hexane, cyclohexane and tetrahydrofuran.

As the di- or tri-valent metal, metals capable of readily forming a complex with an organic halide, such as magnesium, zinc, tin and copper are preferred. It is preferable to conduct the reaction in the presence of such metal at a temperature ranging from room temperature to the boiling point of the reaction mixture in an inert atmosphere such as nitrogen, argon, helium, etc. Thus, compounds of the above formula (1) may be formed.

Specific examples of compounds of above formulas (2), (3-1) and (3-2) to be used in the above reaction have already been illustrated. Typical examples of compounds of above formula (2-4) to be used in the above reaction will now be illustrated.

Specific Examples of Compounds of Formula (2-4)

(135) 1-Isopropyl-3-methylaminoazetidine-3-N-chloride
(136) 1-Ethyl-2-methyl-3-ethylaminoazetidine-3-N-bromide
(137) 1-Cyclohexyl-3-allylaminoazetidine-3-N-chloride
(138) 1-Tert-butyl-3-methylaminoazetidine-3-N-chloride
(139) 1-Isopropyl-3-ethylaminoazetidine-3-N-chloride
(140) 1-Isopropyl-3-n-butylaminoazetidine-3-N-chloride
(141) 1-Isopropyl-3-iso-butylaminoazetidine-3-N-chloride
(142) 1-Ethyl-2-phenyl-3-ethylaminoazetidine-3-N-chloride
(143) 1-Methyl-3-ethylaminoazetidine-3-N-chloride (144) 1-Benzyl-3-ethylaminoazetidine-3-N-chloride In compounds of the above formula (1) formed by the reaction between compounds of the above formula (2), (2-1) or (2-2) and compounds of the above formula (3), (3-1) or (3-2), or compounds of the above formula (6) formed by the reaction of compounds of the above formula (4) and compounds of the above formula (5), in case $R_4$ is a hydrogen atom, said hydrogen atom may be converted to (1) a saturated or unsaturated aliphatic hydrocarbon residue, especially an alkyl group, (ii) an acyl group, (iii) an alkoxycarbonyl group or (iv) an aryl group by a method known per se.

Methods for such conversion have been known in the art. Thus, only outlines of methods for such conversion will now be described.

I. Method for Alkylation of $R_4$ (H)

As the method for such alkylation, there may be mentioned, for example, a method comprising reacting a compound in which $R_4$ is a hydrogen under heat in the presence of a solvent with an alkylating halogen compound such as methyl iodide, ethyl bromide, allyl bromide, butenyl bromide and phenylvinyl bromide; an alkylation method employing diazomethane; a method comprising carrying out the alkylation under alkaline conditions with use of an alkyl sulfate such as dimethyl sulfate and diethyl sulfate; and a method comprising converting a compound in which $R_4$ is a hydrogen atom to an alkali metal derivative by reacting it with such an agent as sodium hydride, sodium amide, lithium hydride, potassium hydride, triphenylmethyl lithium, and reacting the alkali metal derivative with an alkyl halide such as mentioned above. Thus, it is possible to obtain a compound in which $R_4$ is converted to an alkyl group.

II. Method for Acylation of $R_4$ (H)

As the method for such acylation, there may be mentioned, for instance, a method comprising a compound in which $R_4$ is a hydrogen atom with an acylating agent of the acid type such as acetic acid, propionic acid, benzoic acid, cinnamic acid and p-toluenesulfonic acid in the presence of a solvent and a condensing agent such as dicyclohexyl carbodiimide; a method comprising reacting a compound in which $R_4$ is a hydrogen atom with an acylating agent of the acid anhydride type such as acetic anhydride and propionic anhydride in the presence of such an acid binder as pyridine, triethylamine, caustic alkali and alkali carbonate; and a method comprising reacting a compound in which $R_4$ is a hydrogen atom with an acylating agent of the acid halide type such as acetyl chloride, acetyl bromide, propionyl chloride, benzoyl chloride, cinnamoyl chloride and p-toluenesulfonyl chloride in the absence or presence of such an acid binder as mentioned above. By adopting any of such known methods, a compound in which $R_4$ is an acyl group can be converted to a compound in which $R_4$ is an acyl group.

III. Method for Alkoxycarbonylation of $R_4$ (H)

As the method for converting the hydrogen atom as $R_4$ to an alkoxycarbonyl group, there may be mentioned, for instance, a method comprising reacting a compound in which $R_4$ is a hydrogen atom with an alkyl haloformate such as methyl chloroformate, ethyl chloroformate and isobutyl chloroformate under anhydrous conditions in the presence of an acid binder such as tertiary amines and pyridine at room temperature or under cooling.

IV. Method for Arylation of $R_4$ (H)

As the method for arylation of a compound in which $R_4$ is a hydrogen atom, there may be mentioned, for instance, a method comprising reaction such compound with an aryl halide such as bromobenzene, iodobenzene, p-bromotoluene and p-bromoanisol under heating in the presence of a solvent; and a method comprising reacting with such compound with an agent such as sodium hydride, potassium hydride, lithium hydride, sodium amide and triphenylmethyl lithium to convert it to an alkali metal derivative, and then reacting the resulting alkali metal derivative with an aryl halide such as mentioned above.

Compounds of above formula (1) or (6) are sometimes prepared in the form of acid-ammonium salts in which ammonium salt groups are located at the 1-position and/or the 3-substituted-N-position, according to any of above-mentioned methods for direct formation of acid-ammonium salts. In case such method for direct formation of acid-ammonium salts is not adopted, namely in case both or either of the nitrogen atom at the 1-position of the azetidine ring and the nitrogen atom of the substituted amino group at the 3-position of the azetidine ring takes a form of a secondary or tertiary amine, when such compounds of above formula (1) or (6) are contacted with an acid such as mentioned above directly or after it has been dissolved in an organic solvent such as mentioned above, the nitrogen atom at the 1-position and/or at the 3-substituted-N-position may be converted to an ammonium salt with such acid. If $R_4$ on the above formula (1) or (6) is an acyl or alkoxycarbonyl group, only the nitrogen atom located at the 1-position is converted to an ammonium salt.

In case as such acid is used an organic acid such as acetic acid, oxalic acid, citric acid, salicyclic acid or tartaric acid, or an inorganic acid such as hydrochloric acid, nitric acid, sulfuric acid or phosphoric acid, ammonium salts can readily be obtained at room temperature or under cooling according to a customary technique. However, in case an ammonium salt is formed with use of an alkyl halide such as methyl iodide, ethyl bromide propyl bromide and butyl bromide, it is preferred to conduct the reaction between a compound of above formula (1) or (6) and such alkyl halide at elevated temperature under pressure.

In compounds of above formula (1) or (6), in case the group R bonded to the nitrogen atom located at the 1-position of the azetidine ring is a suitable protective group selected from groups customarily used for protection of the N-position, such as carbobenzoxy, acetyl, benzoyl, mesyl, tosyl, benzyl and diphenylmethyl groups, these compounds may be converted to 3-substituted-amino-azetidine derivatives of above formula (1) or (6) in which R is a hydrogen atom by splitting off R as the protective group by hydrolysis or reduction.

Further, compounds of above formula (1) or (6) in which R is a hydrogen atom may be converted to (A) compounds in which R is an alkyl group included in the definition of R by an alkylation method such as illustrated hereinabove with respect to the conversion of the hydrogen atom as $R_4$ into a saturated or unsaturated alkyl group, or (B) compounds in which R is such a heteroatom-containing hydrocarbon residue as explained above, by adopting customary procedures known in the art.

The alkylation of R at the 1-position in compounds of above formula (1) or (6) in which R is a hydrogen atom may be accomplished coincidentally with the alkylation of the 3-substituted-N-position (R₄) in case R₄ is also a hydrogen atom. However, in case R₄ is other than a hydrogen atom, only R at the 1-position (hydrogen) is converted to an alkyl group by the alkylation.

As detailed hereinabove, according to this invention there are provided novel 3-substituted-amino-azetidine derivatives expressed by the above general formula (1) [or (6)] and their ammonium salts in which ammonium salt groups are located at the 1-position and/or at the 3-substituted-N-position. These azetidine derivatives and ammonium salts exhibit, as illustrated in Examples given hereinbelow, pharmaceutical effects and are excellent as analgesics and/or anti-inflammatory agents.

Moreover, as a result of our investigation it has been found that compounds expressed by the above general formula (1) and their ammonium salts include compounds exhibiting pharmaceutical effects as antihistaminics, tranquilizers, antiemetics, antibiotics, antipyretics, antispasmodics, hypotensive agents and/or antitussives.

Among compounds expressed by the above formula (1) and their ammonium salts, from the viewpoints of readiness for preparation and pharmaceutical effects, 3-substituted-amino-azetidine derivatives expressed by the following formula and their ammonium salts in which ammonium salts are located at the 1-position and/or the 3-substituted-N-position are preferred:

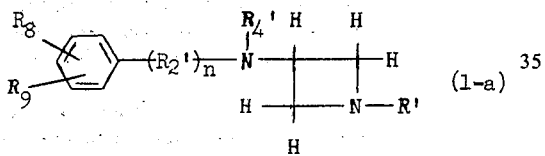

wherein $R'$ is a hydrogen atom, an alkyl group of 1 to 4 carbon atoms, and alkyl group of 1 to 4 carbon atoms substituted by one or two phenyl groups which may be substituted, or a cycloalkyl group having up to 6 carbon atoms, $R_2'$ is a straight or branched alkylene group of 1 to 4 carbon atoms, $n$ is an integer of 0 or 1, when $n$ is 0,

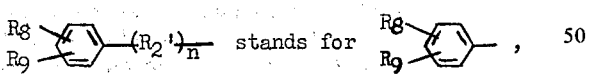

$R_4'$ stands for a hydrogen atom, a saturated or unsaturated alkyl group of 1 to 4 carbon atoms, a cycloalkyl group of 3 to 7 carbon atoms, an alkylcarbonyl group of 1 to 4 carbon atoms or an alkoxycarbonyl group of 1 to 4 carbon atoms, and $R_8$ and $R_9$, which may be the same or different, stand for a hydrogen atom, a lower alkyl group of 1 to 4 carbon atoms, a lower alkoxy group of 1 to 4 carbon atoms, a lower alkoxycarbonyl group of 1 to 4 carbon atoms, a carboxyl group or a halogen atom.

3-Substituted-amino-azetidine derivatives expressed by the following formula and ammonium salts in which ammonium salts groups are located at the 1-position and/or the 3-substituted-N-position are especially preferred:

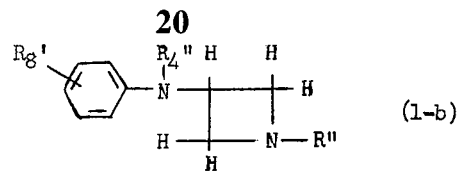

wherein $R''$ is a hydrogen atom, an alkyl group of 1 to 4 carbon atoms, a cyclohexyl group, $R_4''$ is a hydrogen atom, an alkyl group of 1 to 4 carbon atoms or an alkoxycarbonyl group of 1 to 4 carbon atoms, and $R_8$ is a hydrogen atom, an alkoxycarbonyl group or a halogen atom.

Some examples of novel 3-substituted-amino-azetidine derivatives provided by this invention will now be illustrated. However, compounds specifically illustrated in Examples given hereinbelow are omitted from this illustration. Further, for convenience, only compounds in which both the nitrogen atom at the 1-position and the nitrogen of the 3-substituted-amino group are in the form of secondary or tertiary amino groups are illustrated (in other words, ammonium salt forms are omitted from the illustration).

Specific Examples of Compounds of Formula (1)

(145) 1-Methyl-3-(o-methoxyphenylamino)azetidine
(146) 1-Isopropyl-3-(m-nitrophenylamino)azetidine
(147) 1-t-Butyl-3-benzylaminoazetidine
(148) 1-Methyl-3-(N,N-phenylmethylamino)azetidine
(149) 1-t-Butyl-3-(m-methoxyphenylamino)azetidine
(150) 1-t-Butyl-3-(N,N-benzylmethylamino)azetidine
(151) 1-α-Picolinyl-3-(N,N-ethylphenylamino)azetidine
(152) 1-Methyl-3-(β-phenethylamino)azetidine
(153) 1-Methyl-3-(N,N-phenylpropylamino)azetidine
(154) 1-t-Butyl-3-(m-toluylamino)azetidine
(155) 1-t-Butyl-3-(m-ethoxyphenylamino)azetidine
(156) 1-Methyl-3-(o-methoxycarbonylphenylamino)azetidine
(157) 1-t-Butyl-3-(N,N-allylphenylamino)azetidine
(158) 1-Cyclopentyl-3-phenylaminoazetidine
(159) 1-Cyclopentyl-3-benzylaminoazetidine
(160) 1-Methyl-3-phenylaminoazetidine
(161) 1-Ethyl-3-(N,N-methoxycarbonylphenylamino)azetidine
(162) 1-Methyl-3-benzylaminoazetidine
(163) 1-Isopropyl-3-(pyridin-2'-ylamino)azetidine
(164) 1-Isopropyl-3-(α-picolin-4'-ylamino)azetidine
(165) 1-Isopropyl-3-(1'-methylindol-5'-ylamino)azetidine
(166) 1-t-Butyl-3-(pyridazin-4'-ylamino)azetidine
(167) 1-Cyclohexyl-3-(pyridin-2'-ylamino)azetidine
(168) 1-n-Propyl-3-o-toluylaminoazetidine
(169) 1-Cyclohexyl-3-p-ethoxyphenylaminoazetidine
(170) 1-Ethyl-3-(quinolin-4'-ylamino)azetidine
(171) 1-Cyclohexyl-3-(2',4'-dimethoxypyridin-6'-ylamino)azetidine
(172) 1-t-Butyl-3-(6'-methoxypyrimidin-4'-ylamino)azetidine
(173) 1-(Pyridin-2'-yl)-3-o-methoxyphenethylaminoazetidine This invention will now be illustrated more specifically by reference to Examples, but the scope of this invention is not limited by these Examples.

EXAMPLE 1

11.5 g of 1-isopropyl-3-azetidinol and 10.1 g of triethylamine were dissolved in 300 ml of anhydrous ether, and 11.4 g of methane sulfonyl chloride was added dropwise to the solution under ice cooling and agitation. The mixture was agitated for 2 hours under cooling, and precipitated crystals were separated by filtration, Concentration of the filtrate under reduced pressure gave 1-isopropyl-3-methylsulfonyloxyazetidine.

9.3 g of aniline and 10.1 g of triethylamine were dissolved in 40 ml of methanol, and a solution of the above 1-isopropyl-3-methylsulfonyloxyazetidine in 40 ml of methanol was added dropwise to the above solution at room temperature under agitation. The agitation was continued for 48 hours and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 4.3 g of a fraction of 1-isopropyl-3-N-phenylaminoazetidine boiling at 115°C. under 0.5 mm Hg. The hydrochloride of the product had a melting point of 187.5° – 188°C. Results of the infrared analysis and nuclear magnetic resonance analysis of the azetidine derivative obtained in this Example are as follows:

$IR\nu_{NH}^{KBr}$ : 3360 cm$^{-1}$
NMR (in CCl$_4$) :
CH(CH$_3$)$_2$: 0.87 ppm (d)
CH(CH$_3$)$_2$: 1.9 – 2.45 ppm (m)
4H at the 2,4-position: 2.6 – 3.7 ppm
NH: 3.73 ppm (broad)
aromatic 5H: 6.3 – 7.2 ppm (m)

EXAMPLE 2

10.7 g of benzylamine and 10.1 g of triethylamine were dissolved in 40 ml of ethanol, and a solution of 18 g of 1-isopropyl-3-methylsulfonyloxyazetidine in 40 ml of methanol was added dropwise to the above solution at room temperature under agitation. The mixture was agitated for 24 hours and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 2.5 g of a fraction of 1-isopropyl-3-N-benzylaminoazetidine boiling at 90°C. under 0.5 mm Hg. Results of the infrared analysis and nuclear magnetic resonance analysis of the product are as follows:

$IR\nu_{NH}^{KBr}$: 3300 cm$^{-1}$
NMR (in CCl$_4$):
NH: 1.45 ppm (broad)
$\phi$CH$_2$: 3.65 ppm (s)
aromatic 5H: 7.2 ppm (s)

EXAMPLE 3

10.7 g of N-methylaniline and 10.1 g of triethylamine were dissolved in 40 ml of methanol, and a solution of 18 g of 1-isopropyl-3-methylsulfonyloxyazetidine in 40 ml of methanol was added dropwise to the above solution under agitation at room temperature. The agitation was continued for 48 hours and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 5.8 g of a fraction of 1-isopropyl-3-(N-phenyl-N-methyl) aminoazetidine boiling at 98°C. under 0.5 mm Hg. Results of the nuclear magnetic resonance analysis are as follows:

NMR (in CCl$_4$):
N—CH$_3$: 2.88 ppm (s)
aromatic 5H: 6.5 – 7.25 ppm (m)

EXAMPLE 4

12.3 g of m-anisidine and 10.1 g of triethylamine were dissolved in 40 ml of methanol, and a solution of 17 g of 1-isopropyl-3-methylsulfonyloxyazetidine in 40 ml of methanol was added dropwise to the above solution under agitation at room temperature. The mixture was agitated for 48 hours, and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 2.9 g of a fraction of 1-isopropyl-3-(N-3'-methoxyphenyl)aminoazetidine boiling at 118°C. under 0.5 mm Hg. Results of the infrared analysis and nuclear magnetic resonance analysis are as follows:

$IR\nu_{NH}^{KBr}$: 3360 cm$^{-1}$
NMR (in CCl$_4$):
NH: 0.9 ppm (broad)
OCH$_3$: 3.68 ppm (s)
aromatic 4H: 5.9 – 7.05 ppm (m)

EXAMPLE 5

12.1 g of N-methylbenzylamine and 10.1 g of triethylamine were dissolved in 40 ml of methanol, and a solution of 17.5 g of 1-isopropyl-3-methylsulfonyloxyazetidine in 40 ml of methanol was added dropwise to the above solution at room temperature under agitation. The mixture was agitated for 24 hours, and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 3.5 g of a fraction of 1-isopropyl-3-(N-benzyl-N-methyl) aminoazetidine boiling at 88° – 90°C. under 0.5 mm Hg. Results of the nuclear magnetic resonance of the product are as follows:

NMR (in CCl$_4$):
N-CH$_3$: 1.93 ppm (s)
$\phi$CH$_2$: 3.28 ppm (s)
aromatic 5H: 7.2 ppm (s)

EXAMPLE 6

13.5 g of α-phenylpropylamine and 10.1 g of triethylamine were dissolved in 40 ml of methanol, and a solution of 16.5 g of 1-isopropyl-3-methylsulfonyloxyazetidine in 40 ml of methanol was added dropwise to the above solution under agitation at room temperature. The mixture was agitated for 24 hours, and the reaction liquor was concentrated under reduced pressure. The residue was dissolved in 100 ml of benzene, washed with 50 ml of 2.5 N aqueous NaOH, dried over $Na_2SO_4$ and filtered. The solvent was distilled off, and distillation of the residue under reduced pressure gave 4.2 g of a fraction of 1-isopropyl-3-(N-2'-phenylpropyl)aminoazetidine boiling at 105° – 107°C. under 0.5 mm Hg. Results of the infrared analysis and nuclear magnetic resonance analysis of the product are as follows:
IR$\nu_{NH}^{KBr}$: 3250 cm$^{-1}$ (braod)
NMR (in CCl$_4$):
$\phi$CH—CH$_3$: 1.22 ppm (d)
$\phi$CH—CH$_3$: 2.3 – 2.9 ppm (m)
aromatic 5H: 7.15 ppm (s)

EXAMPLE 7

12.1 g of N-ethylaniline and 10.1 g of triethylamine were dissolved in 40 ml of methanol, and a solution of 17.0 g of 1-isopropyl-3-methylsulfonyloxyazetidine in 40 ml of methanol was added dropwise to the above solution under agitation at room temperature. The mixture was agitated for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 7.0 g of a fraction of 1-isopropyl-3-(N-ethyl-N-phenyl)aminoazetidine boiling at 108°C. under 0.5 mm Hg. Results of the nuclear magnetic resonance analysis of the product are as follows:
NMR (in CCl$_4$):
CH$_2$CH$_3$: 1.0 ppm (t)
CH$_2$CH$_3$: 3.28 ppm (quar)
aromatic 5H: 6.5 – 7.75 ppm (m)

The hydrochloride (recrystallized from acetone) of the azetidinol derivative obtained in this Example was found to have a melting point of 156° – 157°C.

EXAMPLE 8

12.1 g of $\beta$-phenylethylamine and 10.1 g of triethylamine were dissolved in 40 ml of tetrahydrofuran, and a solution of 17.0 g of 1-isopropyl-3-methylsulfonyloxyazetidine in 40 ml of methanol was added dropwise to the above solution under agitation at room temperature. The mixture was agitated for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 2.4 g of a fraction of 1-isopropyl-3-(N-$\beta$-phenyl-ethyl)aminoazetidine boiling at 105°C. under 0.5 mm Hg. Results of the infrared analysis and nuclear magnetic resonance analysis of the product are as follows:
IR$\nu_{NH}^{KBr}$: 3300 cm$^{-1}$ (broad)
NMR (in CCl$_4$):
NH: 1.1 ppm
$\phi$CH$_2$CH$_2$: 2.71 ppm (s)
aromatic 5H: 7.15 ppm (s)

The hydrochloride of the azetidine derivative obtained in this Example was found to have a melting point of 165°C.

EXAMPLE 9

13.5 g of N-n-propylaniline and 10.1 g of triethylamine were dissolved in 40 ml of methanol, and a solution of 17.5 g of 1-isopropyl-3-methylsulfonyloxyazetidine in 40 ml of methanol was added dropwise to the above solution under agitation at room temperature. The mixture was agitated for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 4.1 g of a fraction of 1-isopropyl-3-(N-phenyl-N-n-propyl)aminoazetidine boiling at 106° – 106°C. under 0.5 mm Hg. Results of the nuclear magnetic resonance analysis of the product are as follows:
NMR (in CCl$_4$):
CH$_2$Ch$_2$CH$_3$: 0.83 ppm (t)
CH$_2$CH$_2$CH$_3$: 1.46 ppm (m)
CH$_2$CH$_2$CH$_3$: 3.15 ppm (t)
aromatic 5H: 6.48 – 7.25 ppm (m)

EXAMPLE 10

13.7 g of m-phenetidine and 10.1 g of triethylamine were dissolved in 40 ml of methanol, and a solution of 17.5 g of 1-isopropyl-3-methylsulfonyloxyazetidine in 40 ml of methanol was added dropwise to the above solution under agitation at room temperature. The mixture was agitated for 48 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 2.6 g of a fraction of 1-isopropyl-3-(N-m-ethoxyphenyl)aminoazetidine boiling at 115° – 116°C. under 0.5 mm Hg. Results of the infrared analysis and nuclear magnectic resonance analysis of the product are as follows:
IR$\nu_{NH}^{KBr}$: 3360 cm$^{-1}$
MNR (in CCl$_4$):
CH$_2$CH$_3$: 1.33 ppm (great)
NH: 3.8 ppm (broad)
CH$_2$CH$_3$: 3.9 ppm (quar)
aromatic 4H: 5.88 – 7.08 ppm (m)

EXAMPLE 11

11.9 g of m-toluidine and 10.1 g of triethylamine were dissolved in 40 ml of methanol, and a solution of 16.0 g of 1-isopropyl-3-methylsulfonyloxyazetidine in 40 ml of methanol was added dropwise to the above solution under agitation at room temperature. The mixture was agitated for 48 hours and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 1.2 g of a fraction of 1-isopropyl-3-(N-m-tolyl)aminoazetidine boiling at 107°– 108°C. under 0.5 mm Hg. Results of the infrared analysis and nuclear magnetic resonance analysis of the product are as follows:
IR$\nu_{NH}^{KBr}$: 3350 cm$^{-1}$
NMR (in CCl$_4$):
CH$_3$: 2.21 ppm (s)
NH: 3.7 ppm (broad)
aromatic 4H: 6.08 – 7.08 (m)

EXAMPLE 12

15.1 g of methyl anthranilate and 10.1 g of triethylamine were dissolved in 40 ml of methanol, and a solution of 17.0 g of 1-isopropyl-3-methylsulfonyoxyazetidine in 40 ml of methanol was added dropwise to the above solution under agitation at room temperature. The agitation was continued for 48 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under pressure gave 4.0 g of a fraction of 1-isopropyl-3-N-(o-methoxycarbonylphenyl) aminoazetidine boiling at 122°C. under 0.5 mm Hg. Results of the infrared analysis and nuclear magnetic resonance analysis of the product are as follows:

IR$\nu_{NH}^{KBr}$: 3340 cm$^{-1}$
IR$\nu_{CO}^{KBr}$: 1684 cm$^{-1}$
NMR (in CCl$_4$):
NH : 0.95 ppm (broad)
CH$_3$: 3.82 ppm (s)
aromatic 4H: 6.3 – 8.0 ppm (m)

The hydrochloride (recrystallized from methanol/ethyl acetate) of the azetidine derivative obtained in this Example was found to have a melting point of 162.5° – 163°C.

EXAMPLE 13

12.3 g of o-anisidine and 10.1 g of triethylamine were dissolved in 40 ml of methanol, and a solution of 17.5 g of 1-isopropyl-3-methylsulfonyloxyazetidine in 40 ml of methanol was added dropwise to the above solution under agitation at room temperature. The agitation was continued for 48 hours and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 6.0 g of a fraction of 1-isopropyl-3-(N-o-methoxyphenyl)aminoazetidine boiling at 118°C. under 0.5 mm Hg. Results of the infrared analysis and nuclear magnetic resonance analysis of the product are as follows:

IR$\nu_{NH}^{KBr}$: 3380 cm$^{-1}$
NMR (in CCl$_4$):
CH$_3$: 3.78 ppm (s)
NH : 4.2 ppm (broad)
aromatic 4H: 6.2 – 6.9 ppm (m)

The above obtained azetidine derivative was reacted with hydrochloric acid according to a customary method, and the resulting reaction product was recrystallized from methanol/ethyl acetate to obtain 1-isopropyl-3-(N-o-methoxyphenyl)aminoazetidine hydrochloride melting at 188° – 189°C.

EXAMPLE 14

13.3 g of N-allylaniline and 10.1 g of triethylamine were dissolved in 40 ml of methanol, and a solution of 16.5 g of 1-isopropyl-3-methylsulfonyloxyazetidine in 40 ml of methanol was added dropwise to the above solution under agitation at room temperature. The mixture was agitated for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 4.2 g of a fraction of 1-isopropyl-3-(N-allyl-N-phenyl) aminoazetidine boiling at 119°C. under 0.5 mm Hg. Results of the infrared analysis and nuclear magnetic resonance analysis of the product are as follows:

IR$\nu_{C=C}^{KBr}$: 1635 cm$^{-1}$
NMR (in CCl$_4$):
CH$_2$—CH=CH$_2$: 3.4 – 3.7 ppm (m)
CH=CH$_2$: 4.9 – 5.4 ppm (m)
CH$_2$CH=CH$_2$: 5.5 – 6.2 ppm (m)
aromatic 5H: 6.45 – 7.25 ppm (m)

The above obtained azetidine derivative was reacted with hydrochloric acid according to a customary method, and the reaction product was recrystallized from methanol/ethyl acetate to obtain colorless needle crystals of 1-isopropyl-3-(N-allyl-N-phenyl)aminoazetidine hydrochloride melting at 154° – 156°C.

EXAMPLE 15

14.9 g of N-n-butylaniline and 10.1 g of triethylamine were dissolved in 40 ml of methanol, and a solution of 17.1 g of 1-isopropyl-3-methylsulfonyloxyazetidine in 40 ml of methanol was added dropwise to the above solution under agitation at room temperature. The agitation was continued for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 5.5 g of a fraction of 1-isopropyl-3-(N-n-butyl-N-phenyl) aminoazetidine boiling at 118°C. under 0.5 mm Hg. Results of the nuclear magnetic resonance analysis of the product are as follows:

NMR (in CCl$_4$):
CH$_2$CH$_2$CH$_2$CH$_3$: 0.9 ppm (t)
CH$_2$CH$_2$CH$_2$CH$_3$: 0.9 – 1.8 ppm (m)
CH$_2$CH$_2$CH$_2$CH$_3$: 3.18 ppm (t)

The hydrochloride (recrystallized from methanol/ethyl acetate) was found to have a melting point of 149°C.

EXAMPLE 16

4.9 of N-sec-butyl-aniline and 10.1 g of triethylamine were dissolved in 40 ml of methanol, and a solution of 17.5 g of 1-isopropyl-3-methylsulfonyloxyazetidine in 40 ml of methanol was added dropwise to the above solution under agitation at room temperature. The agitation was continued for 24 hours, and the reaction liquor was concentrated under reduced pressure. The residue was dissolved in 100 ml of benzene, washed with 50 ml of 2.5 N aqueous NaOH, dried over Na$_2$SO$_4$ and filtered. The solvent was distilled off, and distillation of the residue under reduced pressure gave 2.5 g of a fraction of 1-isopropyl-3-(N-sec-butyl-N-phenyl)aminoazetidine boiling at 108° – 110°C. under 0.5 mm Hg. Results of the infrared analysis of the product are as follows:

IR KBr: 2950 cm$^{-1}$, 1600 cm$^{-1}$, 1495 cm$^{-1}$, 760 cm$^{-1}$ and 700 cm$^{-1}$ The hydrochloride (recrystallized from acetone) of the above obtained azetidine derivative was found to have a melting point of 166°C.

EXAMPLE 17

7.8 g of N-ethylaniline and 6.5 g of triethylamine were dissolved in 30 ml of methanol, and a solution of 11.2 g of 1-cyclohexyl-3-methylsulfonyloxyazetidine in 30 ml of methanol was added dropwise to the above solution under agitation at room temperature. The agitation was continued for 24 hours, and the reaction liquor was concentrated under reduced pressure. The residue wsa dissolved in 100 ml of benzene, washed with 50 ml of 2.5 N aqueous NaOH, dried over Na$_2$SO$_4$ and filtered. The solvent was distilled off, and distillation of the residue under reduced pressure gave 5.1 g of a fraction of 1-cyclohexyl-3-(N-ethyl-n-phenyl)aminoazetidine boiling at 134° – 135°C. under 0.5 mm Hg. Results of the infrared analysis of the product are as follows:

IR KBr: 2930 cm$^{-1}$, 2850 cm$^{-1}$, 1600 cm$^{-1}$, 1500 cm$^{-1}$, 1366 cm$^{-1}$, 758 cm$^{-1}$ and 700 cm$^{-1}$ 1-Cyclohexyl-3-methylsulfonyloxyazetidine used as the starting compound was prepared in the following manner.

10.0 g of 1-cyclohexyl-3-azetidinol and 6.5 g of triethylamine were dissolved in 300 ml of anhydrous ether, and 7.4 g of methane sulfonyl chloride was added dropwise to the above solution under ice cooling and agitation. The mixture was agitated under ice cooling for 2 hours. Precipitated crystals were removed by filtration, and the filtrate was concentrated under reduced pressure to obtain 1-cyclohexyl-3-methylsulfonyloxyazetidine.

EXAMPLE 18

10 g of benzylamine and 6 g of triethylamine were added to 20 ml of chloroform, and a solution of 12 g of 3-chloro-1-isopropylazetidine in 20 ml of chloroform was added dropwise to the above mixture in a nitrogen current at room temperature. The resulting mixture was heated for about 7 hours on a water bath, and then the reaction liquor was concentrated under reduced pressure. The residue was dissolved in 100 ml of benzene, washed with 50 ml of 2.5 N aqueous NaOH, dried over anhydrous sodium sulfate and filtered. The solvent was distilled off, and distillation of the residue under reduced pressure gave 3 g of 1-isopropyl-3-N-benzylaminoazetidine boiling at 90° – 92°C. under 0.5 mm Hg.

In the same manner as above, 1-isopropyl-3-N-$\beta$-phenylethylaminoazetidine was prepared from $\beta$-phenylethylamine and 1-isopropyl-3-chloroazetidine, and 1-isopropyl-3-(N-2'-phenylpropyl)aminoazetidine was prepared from 2-phenylpropylamine and 1-isopropyl-3-chloroazetidine.

EXAMPLE 19

About 1.3 g of hydrogenated sodium (hydrogenation degree of about 50 %) was added to 5 g of 1-isopropyl-3-N-phenylaminoazetidine, and 20 ml of dried benzene was further added thereto. The mixture was heated on a water bath, and after completion of generation of hydrogen, the mixture was allowed to cool. Then, the mixture was taken into a pressure bottle and 4 g of methyl iodide was added thereto. The mixture was heated at about 100° to about 120°C. on an oil bath. After completion of the reaction, the reaction liquor was taken out from the pressure bottle and concentrated under reduced pressure. The residue was incorporated with ether, treated with a 10 % aqueous solution of NaOH, washed with water and dried over anhydrous sodium sulfate. The ether was distilled off, and the distillation of the residue under reduced pressure gave 3.1 g of 1-isopropyl-3-(N-phenyl-N-methyl-)aminoazetidine boiling at 96° – 99°C. under 0.5 mm Hg.

The so obtained 1-isopropyl-3-N-phenyl-N-methylaminoazetidine was dissolved in anhydrous ether, and hydrogen chloride gas was introduced into the solution to obtain a crude hydrochloride of the above azetidine derivative. Recrystallization of the crude hydrochloride from methanol/ethyl acetate gave colorless needle crystals melting at 150° – 151°C.

EXAMPLE 20

5 g of 1-isopropyl-3-N-benzylaminoazetidine was added to toluene, and 10 g of potassium carbonate and 4 g of methyl iodide was further added thereto. The mixture was heated on an oil bath. After completion of the reaction, the solvent and triethylamine were distilled off under reduced pressure. The residue was incorporated with ether, treated with a 10% aqueous solution of NaOH, subjected to customary post treatments, and subjected to distillation under reduced pressure to obtain 2.4 g of 1-isopropyl-3-(N-benzyl-N-methyl)aminoazetidine boiling at 88° – 89°C. under 0.5 mm Hg.

EXAMPLE 21

5 g of benzyl chloride and 6 g of triethylamine were added to 20 ml of chloroform, and a solution of 12 g of 3-amino-1-isopropylazetidine in 20 ml of chloroform was added dropwise to the above mixture in a nitrogen gas current at room temperature. The resulting mixture was heated for about 7 hours on a water bath, and the reaction liquor was concentrated under reduced pressure. The residue was incorporated with 100 ml of ether, washed with 30 ml of 2.5 N aqueous NaOH, dried over anhydrous sodium sulfate and filtered. After completion of the filtration, the solvent was removed by distillation, and the residued wsa distilled under reduced pressure ot obtain 2 g of 1-isopropyl-3-N-benzylaminoazetidine having a boiling point of 9° – 92°C. under 0.5 mm Hg.

In the same manner as above, 1-isopropyl-3-N-$\beta$-phenylethylaminoazetidine was prepared from $\beta$-phenylethyl bromide and 1-isopropyl-3-aminoazetidine, and 1-isopropyl-3-(N-2'-phenylpropyl)aminoazetidine was prepared from 2-phenylpropyl bromide and 1-isopropyl-3-aminoazetidine.

EXAMPLE 22

1.4 g of acetoanilide and 0.5 g of sodium hydride were suspended in 20 ml of toluene, and the suspension was refluxed for 8 hours, following which the temperature was returned to room temperature. A solution of 2.7 g of 1-isopropyl-3-chloroazetidine in 5 ml of dried toluene was added dropwise to the above mixture under agitation, and the resulting mixture was refluxed for 4 hours. Water was added to the reaction mixture, and the organic layer was recovered, dried over anhydrous sodium sulfate and filtered. The solvent was distilled off from the filtrate and the residue was distilled under reduced pressure to obtain 0.6 g of a fraction of 1-isopropyl-3-N,N-acetylphenylaminoazetidine boiling at 108°C. under 0.025 mm Hg. Results of the infrared analysis and nuclear magnetic resonance analysis of the product are as follows:

IR$\nu_{CO}^{KB}$: 1660 cm$^{-1}$
NMR (in CCl$_4$): COCH$_3$: 1.7 ppm (s) $\phi$: 7.0 – 7.6 ppm (m)

EXAMPLE 23

1.7 g of N-ethoxycarbonylaniline and 0.5 g of sodium hydride were suspended in 20 ml of dried toluene, and the suspension was refluxed for 8 hours, following which the temperature was returned to room temperature. A solution of 2.7 g of 1-isopropyl-3-chloroazetidine in 20 ml of dried toluene was added dropwise to the above mixture under agitation. The resulting mixture was refluxed for 72 hours, and water was added to the reaction mixture. The organic layer was separated and extracted under ice cooling with 2 N aqueous NCl. The water layer was made alkaline under ice cooling with 2 N aqueous NaOH, extracted with ether, dried over anhydrous sodium sulfate and filtereed. The solvent was distilled off from the filtrate, and distillation of the residue under reduced pressure gave 0.4 g of a fraction of 1-isopropyl-3-N,N-ethoxycarbonyl-phenylaminoazetidine boiling at 80°C. under 0.02 mm Hg. Results of the infrared analysis and nuclear magnetic resonance analysis of the product are as follows:
$IR\nu_{CO}^{KBr}$: 1705 cm$^{-1}$
NMR (in CCl$_4$):
CH$_2$CH$_3$: 1.16 ppm (t)
CH$_2$CH$_3$: 4.05 ppm (quar)
$\phi$: 6.8 – 7.5 ppm (m)

EXAMPLE 24

8.6 g of N-cyclohexylaniline and 5.1 g of triethylamine were dissolved in 40 ml of methanol, a solution of 8 g of 1-isopropyl-3-methylsulfonyloxyazetidine in 20 ml of methanol was added dropwise to the above solution under agitation at room temperature. The mixture was agitated for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 1.1 g of a fraction of 1-isopropyl-3-N,N-cyclohexyl-phenylaminoazetidine boiling at 121°C. under 0.5 mm Hg. Results of the nuclear magnetic resonance analysis of the product are as follows:
NMR (in CCl$_4$):
cyclohexyl 11 H: 0.8 – 2.1 ppm (m)
aromatic 5H: 6.65 – 7.45 ppm (m)

EXAMPLE 25

6.4 g of p-chloroaniline and 5.1 g of triethylamine were dissolved in 40 ml of methanol, and a solution of 8 g of 1-isopropyl-3-methylsulfonyloxyazetidine in 20 ml of methanol was added to the above solution under agitation at room temperature. The agitation was continued for 24 hours, and the reaction liquor was concentrated under reduced pressure. The residue was dissolved in 100 ml in benzene, washed with 20 ml of 2.5 N aqueous NaOH, dried over Na$_2$SO$_4$ and filtered. The solvent was distilled off from the filtrate, and distillation of the residue under reduced pressure gave 0.5 g of a fraction of 1-isopropyl-3-N-p-chlorophenylaminoazetidine boiling at 105°C. under 0.5 mm Hg. Results of the infrared analysis and nuclear magnetic resonance analysis are as follows:
$IR\nu_{NH}^{KBr}$: 3380 cm$^{-1}$
NMR (in Ccl$_4$):
NH: 3.95 ppm (broad)
aromatic 4H: 6.25 – 7.1 ppm (m)

The hydrochloride of the above azetidine derivative was found to have a melting point of 216°C.

EXAMPLE 26

6.4 g of m-chloroaniline and 5.1 g of triethylamine were dissolved in 40 ml of methanol, and a solution of 8 g of 1-isopropyl-3-methylsulfonyloxyazetidine in 20 ml of methanol was added dropwise to the above solution under agitation at room temperature. The agitation was continuted for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 0.5 g of a fraction of 1-isopropyl-3-N-m-chlorophenylaminoazetidine boiling at 107°C. under 0.5 mm Hg. Results of the infrared analysis and nuclear magnetic resonance analysis of the product are as follows: $IR\nu_{NH}^{KBr}$: 3390 cm$^{-1}$
NMR (in CCl$_4$):
NH: 4 ppm (broad)
aromatic 4H: 6.15 – 7.1 ppm (m)

The hydrochloride of the above azetidine derivative was found to have a melting point of 169°– 169.5°C.

EXAMPLE 27

6.4 g of o-chloroaniline and 5.1 g of triethylamine were dissolved in 40 ml of methanol, and a solution of 8 g of 1-isopropyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 1.1 g of a fraction of 1-isopropyl-3-N-o-chlorophenylaminoazetidine boiling at 108°C. under 0.5 mm Hg. Results of the infrared analysis and nuclear magnetic resonance analysis of the product are as follows:
$IR\nu_{NH}^{KBr}$: 3390 cm$^{-1}$
NMR (in CCl$_4$):
NH: 4.35 ppm (broad)
aromatic 4H: 6.3 – 7.3 ppm (m)

The hydrochloride of the above azetidine derivative was found to have a melting point of 180° – 181°C.

EXAMPLE 28

6.0 g of aniline and 6.5 g of triethylamine were dissolved in 40 ml of methanol, and a solution of 11 g of 1-cyclohexyl-3-methylsulfonyloxyazetidine in 40 ml of methanol was added dropwise to the above solution under agitation at room temperature. The agitation was continued for 24 hours, and the reaction liquor was concentrated under reduced pressure. The residue was dissolved in 200 ml of benzene, washed with 40 ml of 2.5 N aqueous NaOH, dried over Na$_{SO4}$ and filtered. The solvent was distilled off from the filtrate, and distillation of the residue under reduced pressure gave 1.9 g of a fraction of 1-cyclohexyl-3-N-phenylaminoazetidine boiling at 126°C. under 0.5 mm Hg. Results of the infrared analysis and nuclear magnetic resonance analysis of the product are as follows:
$IR\nu_{NH}^{KBr}$: 3400 cm$^{-1}$
NMR (in CCl$_4$):
NH: 3.8 ppm (broad)
aromatic 5H: 6.3 – 7.3 ppm (m)

The hydrochloride of the above azetidine derivative was found to have a melting point of 179° – 180°C.

EXAMPLE 29

8.7 g of N-n-propylaniline and 6.5 g of triethylamine were dissolved in 40 ml of methanol, and a solution of 11 g of 1-cyclohexyl-3-methylsulfonyloxyazetidine in 40 ml of methanol was added dropwise to the above solution under agitation at room temperature. The agitation wsa continued for 24 hours, and the reaction liquor was concentrated under reduced pressure. The residue was dissolved in 200 ml of benzene, washed with 40 ml of 2.5 N aqueous NaOH, dried over Na$_2$SO$_4$ and filtered. The solvent was distilled off from the solvent, and distillation of the residue under reduced pressure gave 4.3 g of a fraction of 1-cyclohexyl-3-N,N-n-propylphenylaminoazetidine boiling at 134°C. under 0.5 mm Hg. Results of the nuclear magnetic resonance analysis of the product are as follows:

NMR (in $CCl_4$):
$CH_2CH_2CH_3$: 0.85 ppm (t)
$CH_2CH_2CH_3$: 3.15 ppm (t)
aromatic 5H: 6.4 – 7.3 ppm (m)

The hydrochloride of the above azetidine derivative was found to have a melting point of 143.5°C.

EXAMPLE 30

6.9 g of N-methylaniline and 6.5 g of triethylamine were dissolved in 40 ml of methanol, and a solution of 11 g of 1-cyclohexyl-3-methylsulfonyloxyazetidine in 40 ml of methanol was added dropwise to the above solution under agitation at room temperature. The agitation was continued for 24 hours, and the reaction liquor was concentrated under reduced pressure. The residue was dissolved in 200 ml of benzene, washed with 40 ml of 2.5 N aqueous NaOH, dried over $Na_2SO_4$ and filtered. The solvent was distilled off from the filtrate, and distillation of the residue under reduced pressure gave 4.6 g of a fraction of 1-cyclohexyl-3-N,N-methylphenylaminoazetidine boiling at 128°C. under 1.0 mm Hg. Results of the nuclear magnetic resonance analysis of the product are as follows:

NMR (in $CCl_4$):
$CH_3$: 2.77 ppm (s)
aromatic 5H: 6.5 – 7.3 ppm (m)

EXAMPLE 31

8.6 g of N-allylaniline and 6.5 g of triethylamine were dissolved in 40 ml of methanol, and a solution of 11 g of 1-cyclohexyl-3-methylsulfonyloxyazetidine in 40 ml of methanol was added dropwise to the above solution under agitation at room temperature. The agitation was continued for 24 hours, and the reaction liquor was concentrated under reduced pressure. The residue was dissolved in 200 ml of benzene, washed with 40 ml of 2.5 N aqueous NaOH, dried over $Na_2SO_4$ and filtered. The solvent was distilled off from the filtrate, and distillation of the residue under reduced pressure gave 1.5 g of a fraction of 1-cyclohexyl-3-N,N-allylphenylazetidine boiling at 148°C. under 0.04 mm Hg. Results of the nuclear magnetic resonance analysis of the product are as follows:

NMR (in $CCl_4$):
$CH_2CH=CH_2$: 3.75 ppm (m)
$CH_2CH=CH_2$: 5.18 ppm
$CH_2CH=CH_2$: 6.3 ppm (m)
aromatic 5H: 6.3 – 7.3 ppm (m)

EXAMPLE 32

6.1 g of N-ethylaniline and 5.1 g of triethylamine was dissolved in 20 ml of methanol, and a solution of 8 g of 1-ethyl-3-methylsulfonyloxyazetidine in 10 ml of methanol was added dropwise to the above solution under agitation at room temperature. The agitation was continued for 48 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 0.8 g of a fraction of 1-ethyl-3-N,N-ethylphenylaminoazetidine boiling at 77°C. under 0.5 mm Hg. Results of the nuclear magnetic resonance analysis of the product are as follows:

NMR (in $CCl_4$):
$\phi CH_2CH_3$: 1.0 ppm (t)
$\phi CH_2CH_3$: 3.28 ppm (quar)
aromatic 5H: 6.4 – 7.4 ppm (m)

The hydrochloride of the above azetidine derivative was found to have a melting point of 162°C.

EXAMPLE 33

4.7 g of aniline and 5.1 g of triethylamine were dissolved in 20 ml of methanol, and a solution of 8 g of 1-ethyl-3-methylsulfonlyoxyazetidine in 10 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 0.6 g of a fraction of 1-ethyl-3-N-phenylaminoazetidine boiling at 80°C. under 0.5 mm Hg. Results of the infrared analysis and nuclear magnetic resonance analysis of the product are as follows:

$IR\nu_{NH}^{KBr}$: 3360 $cm^{-1}$
NMR (in $CCl_4$):
NH: 3.8 ppm (broad)
aromatic 5H: 6.28 – 7.25 ppm (m)

EXAMPLE 34

6.8 g of N-n-propylaniline and 5.1 g of triethylamine were dissolved in 40 ml of methanol, and a solution of 8 g of 1-ethyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 1.3 g of a fraction of 1-ethyl-3-N,N-n-propylphenylaminoazetidine boiling at 107°C. under 0.5 mm Hg. Results of the nuclear magnetic resonance analysis of the product are as follows:

NMR (in $CCl_4$):
$CH_2CH_2CH_3$: 0.96 ppm (t)
$CH_2CH_2CH_3$: 1.5 – 1.9 ppm (m)
$CH_2CH_2CH_3$: 3.14 ppm (t)
aromatic 5H: 6.3 – 7.3 ppm (m)

EXAMPLE 35

5.4 g of N-methylaniline and 5.1 g of triethylamine were dissolved in 40 ml of methanol, and a solution of 8 g of 1-ethyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 1.2 g of a fraction of 1-ethyl-3-N,N-methylphenylaminoazetidine boiling at 84°C. under 0.5 mm Hg. Results of the nuclear magnetic resonance analysis of the product are as follows:

NMR (in CCl$_4$):
N-CH$_3$: 2.78 ppm (s)
aromatic 5H: 6.3 – 7.3 ppm (m)

EXAMPLE 36

7.5 g of N-n-butylaniline and 5.1 g of triethylamine were dissolved in 40 ml of methanol, and a solution of 8 g of 1-ethyl-3-methylsulfonyloxytriazine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 1.0 g of a fraction of 1-ethyl-3-N,N-n-butylphenylaminoazetidine boiling at 93°C. under 0.5 mm Hg. Results of the nuclear magnetic resonance analysis of the product are as follows:
NMR (in CCl$_4$):
n-C$_4$H$_7$ 7H: 0.8 – 1.8 ppm
n-C$_4$H$_7$ 2H: 2.9 – 3.4 ppm
aromatic 5H: 6.3 – 7.3 ppm

EXAMPLE 37

6.7 g of N-allylaniline and 5.1 g of triethylamine were dissolved in 40 ml of methanol, and a solution of 8 g of 1-ethyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 1.0 g of a fraction of 1-ethyl-3-N,N-allylphenylaminoazetidine boiling at 92°C. under 0.5 mm Hg. Results of the nuclear magnetic resonance analysis are as follows:
NMR (in CCl$_4$):
CH$_2$CH=CH$_2$: 3.2 ppm (m)
CH$_2$CH=CH$_2$: 5.15 ppm (m)
CH$_2$CH=CH$_2$: 5.5 – 6.15 ppm (m)
aromatic 5H: 6.3 – 7.3 ppm (m)

EXAMPLE 38

9.2 of phenetylamine and 7.8 g of triethylamine were dissolved in 50 ml of methanol, and a solution of 14 g of 1-tert.-butyl-3-tosyloxyazetidine in 50 ml of methanol was added dropwise to the above solution under agitation at room temperature. The agitation was continued for 48 hours, and the reaction liquor was concentrated under reduced pressure. The residue was dissolved in 200 ml of benzene, washed with 20 ml of 2.5 N aqueous NaOH, dried over Na$_2$SO$_4$ and filtered. The solvent was distilled off from the filtrate, and distillation of the residue under reduced pressure gave 2.9 g of a fraction of 1-tert.-butyl-3-N-phenetylaminoazetidine boiling at 115°C. under 0.5 mm Hg. Results of the infrared analysis and nuclear magnetic resonance analysis of the product are as follows:
IR$\nu_{NH}^{KBr}$: 3300 cm$^{-1}$
MNR (in CCl$_4$):
$\phi$CH$_2$CH$_2$: 2.7 ppm (s)
aromatic 5H: 7.11 ppm (s)
The hydrochloride of the above azetidine derivative was found to have a melting point of 191°–192°C.

EXAMPLE 39

10.5 g of 1tert.-butyl-3-chloroazetidine, 18 g of 2-phenylpropyaline, 10 g of potassium carbonate and 33 ml of methyl cyanate were reacted at 70°C. under agitation in a sealed tube for 10 days. The solvent was distilled off from the reaction mixture, and then 20 ml of water was added to the residue, followed by other extraction, drying with Ma$_2$SO$_4$ and filtration. The solvent was distilled off from the filtrate, and distillation of the residue under reduced pressure gave 9.0 g of a fraction of 1-tert.-butyl-3-(N-2-phenylpropyl-)aminoazetidine boiling at 105°C. under 0.5 mm Hg. Results of the infrared analysis and nuclear magnetic resonance analysis of the product are as follows:
IR$\nu_{NH}^{KBr}$: 3300 cm$^{-1}$
NMR (in CCl$_4$):
9H: 0.84 ppm (s)
3H: 1.24 ppm (double)
5H: 2.65 ppm (m)
3H: 3.21 ppm (m)

EXAMPLE 40

6.1 g of N-ethylaniline and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 4.5 g of a fraction of 1-tert.-butyl-3-N,N-ethylphenylaminoazetidine boiling at 119°C. under 0.5 mm Hg. Results of the nuclear magnetic resonance analysis of the product are as follows:
NMR (In CCl$_4$):
CH$_2$CH$_3$: 1.0 ppm (t) CH$_2$CH$_3$: 2.25 ppm (aqur)
aromatic 5H: 6.4 – 7.25 ppm (m)

EXAMPLE 41

4.7 g of aniline and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over Na$_2$SO$_4$ and filtered. The solvent was distilled off from the filtrate, and distillation of the residue under reduced pressure gave 3.7 g of a fraction of 1-tert.-butyl-3-N-phenylaminoazetidine boiling at 115°C. under 0.5 mm Hg. Results of the infrared analysis and nuclear magnetic resonance analysis of the product are as follows:
IR $\nu_{NH}^{KBr}$: 3390 cm$^{-1}$
NMR (in CCl$_4$):
NH: 3.76 ppm (broad)
aromatic 5H: 6.25 – 7.2 ppm (m)

EXAMPLE 42

7.6 g of methyl anthranilate and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 1.0 N aqueous NaOH, dried over $Na_2SO_4$ and filtered. The solvent was distilled off from the filtrate, and distillation of the reside under reduced pressure gave 1.2 g of a fraction of 1-tert.-butyl-3-N-o-methoxycarbonylphenylaminoazetidine boiling at 145°C. under 0.5 mm Hg. Results of the infrared analysis and nuclear magnetic resonance analysis of the product are as follows:

$IR\nu_{NH}^{KBr}$: 3350 cm$^{-1}$
$IR\nu_{CO}^{KBr}$: 1690 cm$^{-1}$
NMR (in $CCl_4$):
NH: 3.0 ppm (broad)
$COOCH_3$: 3.8 ppm (s)
aromatic 5H: 6.25 – 7.95 ppm (m)

The hydrochloride of the above azetidine derivative was found to have a melting point of 147°C.

EXAMPLE 43

5.4 g of N-methylaniline and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 4.2 g of a fraction of 1-tert.-butyl-3-N,N-methylphenylaminoazetidine boiling at 108° – 109°C. under 0.5 mm Hg. Results of the nuclear magnetic resonance analysis of the product are as follows:

NMR (in $CCl_4$):
N—$CH_3$: 2.75 ppm (s)
aromatic 5H: 6.45 – 7.25 ppm (m)

The hydrochloride of the above azetidine derivative was found to have a melting point of 172°C.

EXAMPLE 44

6.8 g of N-n-propylaniline and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 3.9 g of a fraction of 1-tert.-butyl-3-N,N-n-propylphenylaminoazetidine boiling at 121°C. under 0.5 mm Hg. Results of the nuclear magnetic resonance analysis of the product are as follows:

NMR (in $CCl_4$):
12H: 0.7 – 1.1 ppm (m)
2H: 1.2 – 1.8 ppm (m)
7H: 2.8 – 3.6 ppm (m)
1H: 3.7 – 4.1 ppm (m)
aromatic 5H: 6.4 – 7.2 ppm The hydrochloride of the above azetidine derivative was found to have a melting point of 159°C.

EXAMPLE 45

7.5 g of N-m-butylaniline and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 4.1 g of a fraction of 1-tert.-butyl-3-N,N-n-butylphenylaminoazetidine boiling at 128°C. under 1.0 mm Hg. Results of the nuclear magnetic resonance analysis of the product are as follows:

NMR (in $CCl_4$):
18H: 0.7 – 1.7 ppm (m)
4H: 2.75 – 3.55 ppm (m)
1H: 3.65 – 4.1 ppm
aromatic 5H: 6.4 – 7.3 ppm

EXAMPLE 46

8.3 g of ethyl anthranilate and 5.1 g of triethylamine were dissolved in 40 ml of methanol, and a solution of 9 g of 1-tert.-butyl-3-methylsulfonyloxyazetidine in 20 ml of methanol was added dropwise to the above solution under agitation at room temperature. The agitation was continued for 48 hours, and the reaction liquor was concentrated under reduced pressure. The residue was dissolved in 100 ml of benzene, washed with 20 ml of 1.0 N aqueous NaOH, dried over $Na_2SO_4$ and filtered. The solvent was distilled off from the filtrate, and distillation of the residue under reduced pressure gave 1.1 g of a fraction of 1-tert.-butyl-3-N-o-ethoxycarbonylphenylaminoazetidine boiling at 147°C. under 0.5 mm Hg. Results of the infrared analysis and nuclear magnetic resonance analysis of the product are as follows:

$IR\nu_{NH}^{KBr}$: 3350 cm$^{-1}$
$IR\nu_{CO}^{KBr}$: 1685 cm$^{-1}$
NMR (in $CCl_4$):
$CH_2CH_3$: 1.35 ppm (t)
$CH_2CH_3$: 4.25 ppm (quar)
aromatic 5H: 6.25 – 8.0 ppm (m)

EXAMPLE 47

4.7 g of aniline and 5.1 g of triethylamine were dissolved in 40 ml of methanol, and a solution of 9 g of 1-sec-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 1.4 g of a fraction of 1-sec-butyl-3-N-phenylaminoazetidine boiling at 95°C. under 0.5 mm Hg. Results of the infrared analysis and nuclear magnetic resonance analysis are as follows:

$IR\nu_{NH}^{KBr}$: 3380 cm$^{-1}$
NMR (in $CCl_4$):
NH: 3.8 ppm (broad)
aromatic 5H: 6.26 – 7.3 ppm (m)

EXAMPLE 48

6.1 g of N-ethylaniline and 5.1 g of triethylamine were dissolved in 40 ml of methanol, and a solution of 9 g of 1-sec-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 2.5 g of a fraction of 1-sec-butyl-3-N,N-ethylphenylaminoazetidine boiling at 98.5°C. under 0.5 mm Hg. Results of the nuclear magnetic resonance analysis of the product are as follows:

NMR (in $CCl_4$):
$NCH_2CH_3$: 1.0 ppm (t)
$NCH_2CH_3$: 3.26 ppm (quar)
aromatic 5H: 6.4 – 7.35 ppm (m)

EXAMPLE 49

6.1 g of N-ethylaniline and 5.1 g of triethylamine were dissolved in 40 ml of methanol, and a solution of 9 g of 1-iso-butyl-3-methylsulfonyloxyazetidine in 20 ml of methanol was added dropwise to the above solution. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 2.9 g of a fraction of 1-iso-butyl-3-N,N-ethylphenylaminoazetidine boiling at 111°C. under 0.5 mm Hg. Results of the nuclear magnetic resonance analysis are as follows:

NMR (in $CCl_4$):
$NCH_2CH_3$: 1.02 ppm (t)
$NCH_2CH_3$: 3.29 ppm (quar)
aromatic 5H: 6.45 – 7.3 ppm (m)

EXAMPLE 50

4.7 g of aniline and 5.1 g of triethylamine were dissolved in 40 ml of methanol, and a solution of 9 g of 1-iso-butyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 2.5 g of a fraction of 1-iso-butyl-3-N-phenylaminoazetidine boiling at 110°C. under 0.5 mm Hg. Results of the infrared analysis and nuclear magnetic resonance analysis of the product are as follows:

$IR\nu_{NH}^{KBr}$: 3380 cm$^{-1}$
NMR (in $CCl_4$):
NH: 3.7 ppm (broad)
aromatic 5H: 6.25 – 7.25 ppm (m)

EXAMPLE 51

5.3 g of N-ethylaniline and 4.4 g of triethylamine were dissolved in 40 ml of methanol, and a solution of 7 g of 1-n-propyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 100 ml of 2.5 N aqueous NaOH, dried over $Na_2SO_4$ and filtered. The solvent was distilled off from the filtrate, and distillation of the residue under reduced pressure gave 0.8 g of a fraction of 1-n-propyl-3-N,N-ethylphenylaminoazetidine boiling at 92°C. under 0.5 mm Hg. Results of the nuclear magnetic resonance analysis are as follows:

NMR (in $CCl_4$):
$NCH_2CH_3$: 1.12 ppm (t)
$NCH_2CH_3$: 3.26 ppm (quar)
aromatic 5H: 6.3 – 7.4 ppm (m)

EXAMPLE 52

3.6 g of N-ethylaniline and 3.1 g of triethylamine were dissolved in 40 ml of methanol, and a solution of 6 g of 1-iso-amyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and distillation of the residue under reduced pressure gave 1.5 g of a fraction of 1-iso-amyl-3-N,N-ethylphenylaminoazetidine boiling at 118°C. under 0.5 mm Hg. Results of the nuclear magnetic resonance analysis of the product are as follows:

NMR (in $CCl_4$):
$NCH_2CH_3$: 1.0 ppm (t)
$NCH_2CH_3$: 3.28 ppm (quar)
aromatic 5H: 6.4 – 7.4 ppm (m)

EXAMPLE 53

1.5 g of N-ethylaniline and 1.2 g of triethylamine were dissolved in 40 ml of methanol, and a solution of 3.8 g of 1-benzhydryl-3-methylsulfonyloxyazetidine in 100 ml of methanol was added dropwise to the above solution under agitation at room temperature. The agitation was continued for 48 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off from the filtrate, and the residue was purified by chromatography employing an alumina-benzene column having a diameter of 5 cm and a length of 80 cm to obtain 1.7 g of 1-benzhydryl-3-N,N-ethylphenylaminoazetidine. Results of the nuclear magnetic resonance analysis are as follows:

NMR (in $CCl_4$):
$CH_2CH_3$: 0.95 ppm (t)
$CH_2CH_3$: 3.25 ppm (quar)
aromatic 5H: 6.4 – 7.5 ppm (m)

The hydrochloride of the above azetidine derivative was found to have a melting point of 185°– 186°C.

EXAMPLE 54

3.1 g of N-ethylaniline and 2.5 g of triethylamine were dissolved in 40 ml of methanol, and a solution of 6 g of 1-phenetyl-3-methylsulfonyloxyazetidine in 40 ml of methanol was added dropwise to the above solution under reduced pressure at room temperature. The agitation was continued for 48 hours, and the reaction liquor was concentrated under reduced pressure. The residue was dissoled in 100 ml of benzene, washed with 20 ml of 2.5 N aqueous NaOH, dried over $Na_2SO_4$ and filtered. The solvent was distilled off from the filtrate, and the residue was purified by chromatography employing an alumina-benzene column having a diameter of 5 cm and a length of 80 cm to obtain 1.5 g of 1-phenetyl-3-N,N-ethylphenylaminoazetidine. Results of the nuclear magnetic resonance analysis of the product are as follows:

NMR (in $CCl_4$):
$CH_2CH_3$: 0.99 ppm (t)
$CH_2CH_3$: 3.26 ppm (quar)
aromatic 10H: 6.45 – 7.4 ppm (m)

The hydrochloride of the above azetidine derivative was found to have a melting point of 143° – 145°C.

EXAMPLE 55

3.6 g of N-ethylaniline and 3.1 g of triethylamine were dissolved in 40 ml of methanol, and a solution of 5.5 g of 1-methyl-3-methylsulfonyloxyazetidine in 20 ml of methanol was added dropwise to the above solution under agitation at room temperature. The agitation was continued for 24 hours, and the reaction liquor was concentrated under reduced pressure. The residue was dissolved in ether, washed with a 20 % aqueous solution of NaOH, dried over $Na_2SO_4$ and filtered. The ether was distilled off from the filtrate, and distillation of the residue gave 2.1 g of 1-methyl-3-N,N-ethylphenylaminoazetidine boiling at 92° – 94°C. under 0.5 mm Hg.

EXAMPLE 56

18.7 g of 1-isopropyl-3-aminoazetidine was dissolved in 100 ml of ethanol, and 21.2 g of benzaldehyde was added thereto. Then the mixture was heated under reflux for 30 minutes. After cooling of the reaction mixture, 500 mg of a 5 %-palladium-on-carbon catalyst was added to the reaction mixture and the hydrogenation was effected at room temperature while blowing in hydrogen. When absorption of hydrogen was not observed, the reaction was stopped, and after the catalyst was removed by filtration, the solvent was distilled off under reduced pressure. The residue was suspended in ethyl acetate and washed with a 5 % aqueous solution of sodium carbonate and then with water. The organic layer was dried over anhydrous sodium sulfate, and the solvent was distilled off. The residue was subjected to vacuum distillation and a fraction boiling at 90°C. under 0.5 mm Hg was collected. Thus was obtained 18.2 g of intended 1-isopropyl-3-N-benzylaminoazetidine, the yield being 90 %. Results of the infrared analysis and nuclear magnetic resonance analysis of the product are as follows:

$IR\nu_{NH}^{KBr}$: 3300 $cm^{-1}$
NMR (in $CCl_4$):
NH: 1.45 ppm (broad)
$\phi CH_2$: 3.65 ppm (s)
aromatic 5H: 7.2 ppm (s)

EXAMPLE 57

19 g of 1-isopropyl-3-N-phenylazetidine was dissolved in 150 ml of tetrahydrofuran, and 1 g of palladium black was added thereto. Further, 8.81 g of acetoaldehyde was added to the mixture and it was sealed in an autoclave. Hydrogen was introduced under a pressure of 30 – 50 $Kg/cm^2$ and the reaction was carried out at 50°C. for 12 hours. After cooling of the reaction mixture, the autoclave was opened, and the catalyst was removed by fitration. The filtrate was concentrated under reduced pressure, and the residue was subjected to vacuum distillation. A fraction boiling at 108°C. under 0.5 mm Hg was collected to obtain 8.7 g of intended 1-isopropyl-3-N,N-phenylethylaminoazetidine. Results of the nuclear magnetic resonance analysis are as follows:

NMR (in $CCl_4$):
$CH_2CH_3$: 1.0 ppm (t)
$CH_2CH_3$: 3.28 ppm (quar)
aromatic 5H: 6.5 – 7.75 ppm (m)

The hydrochloride of the above compound was found to have a melting point of 156° to 157°C.

EXAMPLE 58

19 g of 1-isopropyl-3-N-phenylaminoazetidine and 10 ml of methylethylketone were added to 150 ml of tetrahydrofuran. Then, 500 mg of platinum black was added to the mixture, and in an autoclave the mixture was reacted at 50°C. for 10 hours under hydrogen pressure of 50 $Kg/cm^2$. After cooling of the reaction mixture, the autoclave was opened and the catalyst was removed by filtration. The filtrate was concentrated under reduced pressure. Distillation of the residue under reduced pressure gave 1.42 g of 1-isopropyl-3-N-sec-butyl-N-phenylaminoazetidine boiling at 108° – 110°C. under 0.5 mm Hg. The hydrochloride of the product was found to have a melting point of 165° – 166°C.

EXAMPLE 59

3.4 g of 1-benzyhydryl-3-N,N-ethylphenylaminoazetidine was added to 50 ml of ethyl acetate, and then 700 mg of 5 %-palladium-on-carbon was added thereto. The hydrogenation was conducted at room temperature under atmospheric pressure. When a prescribed amount of hydrogen was absorbed, the reaction was stopped. The catalyst was removed by filtration, and the filtrate was concentrated under reduced pressure. Distillation of the residue under reduced pressure gave 1.5 g of 3-N,N-ethylphenylaminoazetidine boiling at 94° – 97°C. under 0.3 mm Hg.

EXAMPLE 60

3.5 g of 3-N,N-ethylphenylaminoazetidine, 3 ml of acetaldehyde and 500 mg of palladium black were added to 20 ml of tetrahydrofuran, and the mixture was reacted in an autoclave at 70°C. under a hydrogen pressure of 50 $Kg/cm^2$ for 10 hours. After cooling of the reaction mixture, the autoclave was opened, and the catalyst was removed by filtration. The filtrate was concentrated under reduced pressure. Distillation of the residue under pressure gave 3.7 g of 1-ethyl-3-(N,N-ethylphenyl)-aminoazetidine boiling at 75° – 76°C. under 0.5 mm Hg. The hydrochloride of the product was found to have a melting point of 161° – 162°C.

EXAMPLE 61

8.1 g of m-trifluoromethylaniline and 5.1 g of triethylamine were dissolved in 40 ml of methanol, and a solution of 8 g of 1-isopropyl-3-methylsulfonyloxyazetidine in 20 ml of methanol was added dropwise to the above solution under agitation. The agitation was continued for 24 hours, and the reaction liquor was concentrated under reduced pressure. The residue was dissolved in 100 ml of benzene, washed with 20 ml of 2.5 N aqueous NaOH, dried over $Na_2SO_4$ and filtered. The solvent was distilled off, and distillation of the residue under reduced pressure gave 1.5 g of 1-isopropyl-3-(m-trifluoromethylphenyl)aminoazetidine in the form of a fraction boiling at 106° – 107°C. under 0.6 mm Hg. Results of the infrared analysis and nuclear magnetic resonance analysis are as follows:

$IR\nu_{NH}^{KBr}$: 3280 $cm^{-1}$
HMR (in $CCl_4$):
NH : 4.1 ppm (broad)
aromatic 4H : 6.4 – 7.4 ppm (m)

The hydrochloride of the above product was found to have a melting point of 188.5° – 189°C.

EXAMPLE 62

13.4 g of 1-isopropyl-3-chloro-azetidine was dissolved in 250 ml of dried benzene, and 65 g of powdery zinc was added to the solution. The mixture was heated under reflux for 24 hours. A solution of 16.9 g of N-methylaniline-N-chloride in 50 ml of dried benzene was added dropwise to the above reaction mixture under agitation, and then the mixture was heated under reflux for 3 hours under agitation. After cooling of the reaction mixture, insoluble matters were removed by filtration, and the solvent was distilled off from the filtrate. Distillation of the residue in vacuo gave 8.3 g of a fraction of 1-isopropyl-3-(N,N-methylphenyl) amino-azetidine boiling at 98°C. under 0.5 mm Hg. The physical constants of the product obtained in this Example coincided with those of the compound obtained in Example 3.

EXAMPLE 63

17.1 g of benzyl bromide was dissolved in 150 ml of dried tetrahydrofuran, and 24 g of magnesium foil was added thereto. The mixture was agitated to form a solution of magnesium bromide. A solution of 14.9 g of 1-isopropyl-3-methyl-aminoazetidine-3-N-chloride in 100 ml of dried benzene was added dropwise to the above magnesium bromide solution. The mixture was heated under reflux for 4.5 hours under agitation. After cooling of the reaction mixture, insoluble matters were removed by filtration, and the solvent was distilled off from the filtrate. Vacuum distillation of the residue 8.7 g of a fraction of 1-isopropyl-3-(N,N-methylbenzyl)aminoazetidine boiling at 88° – 90°C. under 0.5 mm Hg. Physical constants of the product obtained in this Example coincided with those of the compound obtained in Example 5.

With respect to each of compounds obtained in above Examples, the analgesic activity was measured according to the Writhing test method (mouse). Results are shown in Table given below. The $ED_{50}$ value of aminopyrin was 30 mg/Kg s.c.

Table

| Example No. | Compound Name | $ED_{50}$ (mg/Kg) s.c. |
|---|---|---|
| 1 | 1-isopropyl-3-N-phenylaminoazetidine | 28.5 |
| 2 | 1-isopropyl-3-N-benzylaminoazetidine | 106.0 |
| 3 | 1-isopropyl-3-(N-phenyl-N-methyl)aminoazetidine | 23.0 |
| 4 | 1-isopropyl-3-(N-3'-methoxyphenyl)aminoazetidine | 86.0 |
| 5 | 1-isopropyl-3-(N-benzyl-N-methyl)aminoazetidine | 85.0 |
| 6 | 1-isopropyl-3-(N-2'-phenylpropyl)aminoazetidine | 106.0 |
| 7 | 1-isopropyl-3-(N-ethyl-N-phenyl)aminoazetidine | 19.0 |
| 8 | 1-isopropyl-3-(N-β-phenylethyl)aminoazetidine | 120.0 |
| 9 | 1-isopropyl-3-(N-phenyl-N-n-propyl)aminoazetidine | 12.5 |
| 10 | 1-isopropyl-3-(N-m-ethoxyphenyl)aminoazetidine | 80.0 |
| 11 | 1-isopropyl-3-(N-m-tolyl)aminoazetidine | 31.0 |
| 13 | 1-isopropyl-3-(N-o-methoxyphenyl)aminoazetidine | 41.0 |
| 14 | 1-isopropyl-3-(N-allyl-N-phenyl)aminoazetidine | 26.0 |
| 15 | 1-isopropyl-3-(N-n-butyl-N-phenyl)aminoazetidine | 16.0 |
| 16 | 1-isopropyl-3-(N-sec-butyl-N-phenyl)aminoazetidine | 29.0 |
| 17 | 1-cyclohexyl-3-(N-ethyl-N-phenyl)aminoazetidine | 54.5 |
| 22 | 1-isopropyl-3-N,N-acetylphenylaminoazetidine | 51.0 |
| 23 | 1-isopropyl-3-N,N-ethoxycarbonylphenylaminoazetidine | 10.8 |
| 24 | 1-isopropyl-3-N,N-cyclohexylphenylaminoazetidine | 19.0 |
| 25 | 1-isopropyl-3-N-P-chlorophenylaminoazetidine | 24.2 |
| 26 | 1-isopropyl-3-N-m-chlorophenylaminoazetidine | 38.0 |
| 27 | 1-isopropyl-3-N-o-chlorophenylaminoazetidine | 54.0 |
| 28 | 1-cyclohexyl-3-N-phenylaminoazetidine | 31.0 |
| 29 | 1-cyclohexyl-3-N,N-n-propylphenylaminoazetidine | 103.0 |
| 30 | 1-cyclohexyl-3-N,N-methylphenylaminoazetidine | 34.1 |
| 31 | 1-cyclohexyl-3-N,N-allylphenylaminoazetidine | 25.0 |
| 33 | 1-ethyl-3-N-phenylaminoazetidine | 11.2 |
| 34 | 1-ethyl-3-N,N-n-propylphenylaminoazetidine | 6.8 |
| 35 | 1-ethyl-3-N,N-methylphenylaminoazetidine | 10.5 |
| 36 | 1-ethyl-3-N,N-n-butylphenylaminoazetidine | 12.5 |
| 37 | 1-ethyl-3-N,N-allylphenylaminoazetidine | 10.5 |
| 38 | 1-tert-butyl-3-N-phenetylaminoazetidine | 61.8 |
| 39 | 1-tert-butyl-3-(N-2-phenylpropyl)aminoazetidine | 28.0 |
| 40 | 1-tert-butyl-3-N,N-ethylphenylaminoazetidine | 33.5 |
| 41 | 1-tert-butyl-3-N-phenylaminoazetidine | 22.0 |
| 42 | 1-tert-butyl-3-N-o-methoxycarbonylphenyl-aminoazetidine | 35.5 |
| 43 | 1-tert-butyl-3-N,N-methylphenylaminoazetidine | 45.5 |
| 47 | 1-sec-butyl-3-N-phenylaminoazetidine | 23.5 |
| 49 | 1-iso-butyl-3-N,N-ethylphenylaminoazetidine | 20.5 |
| 50 | 1-iso-butyl-3-N-phenylaminoazetidine | 21.0 |
| 51 | 1-n-propyl-3-N,N-ethylphenylaminoazetidine | 25.8 |

What we claim is:
1. The compound of the formula

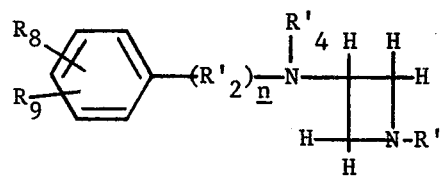

wherein
R' is selected from the group consisting of hydrogen, alkyl of 1 to 4 carbon atoms, a mono- or diphenyl alkyl in which alkyl moiety has 1 to 4 carbon atoms, or a cycloalkyl of 3 to 6 atoms, R' is a straight or branched alkylene of 1 to 4 carbon atoms, n is 0 or 1, $R_8$ and $R_9$, which may be the same or different, and are selected from the group consisting of hydrogen, halogen alkyl of 1 to 4 carbon atoms, alkoxy of 1 to 4 carbon atoms, alkoxycarbonyl of 2 to 4 carbon atoms, haloalkyl of 1 to 4 carbon atoms or carboxyl, with the proviso that two adjacent t-butyl groups or the combination of an alkoxycarbonyl and a carboxyl group does not occur and $R'_4$ stands for hydrogen, alkyl of 1 to 4 carbon atoms, allyl, cycloalkyl of 3 to 7 carbon atoms, alkylcarbonyl of 2 to 4 carbon atoms or an alkoxycarbonyl of 2 to 4 carbon atoms; and an ammonium salt thereof in which ammonium salts are located at the 1-position, 3-substituted-N-position or 1-and 3-substituted-N-positions.

2. A compound of the formula

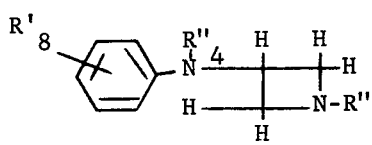

wherein
R'' is selected from the group consisting of hydrogen, alkyl of 1 to 4 carbon atoms, cyclohexyl, phenethyl or diphenylmethyl, $R''_4$ is selected from the group consisting of hydrogen, alkyl of 1 to 4 carbon atoms, allyl, alkylcarbonyl of 2 to 4 carbon atom, alkoxycarbonyl of 2 to 4 carbon atoms or cyclohexyl, and $R'_8$ is selected from the group consisting of hydrogen, alkyl of 1 to 4 carbon atom, alkoxy of 1 to 4 carbon atoms, alkoxycarbonyl of 1 to 4 carbon atoms, trifluoromethyl or a halogen atom, or an ammonium salts thereof, which ammonium salts are located at the 1-position, 3-substituted-N-position, or 1-and 3-N-positions.

3. 3-N,N-ethylphenylaminoazetidine.
4. 1-isopropyl-3-N,N-ethoxycarbonylphenylaminoazetidine.
5. 1-ethyl-3-N,N-p-propylphenylaminoazetidine.
6. 1-isopropyl-3-(N-o-methoxycarbonylphenyl)aminoazetidine.
7. 1-ethyl-3-N,N-methylphenylaminoazetidine.
8. 1-ethyl-3-N,N-allylphenylaminoazetidine.
9. 1-ethyl-3-N,N-ethylphenylaminoazetidine.

* * * * *

UNITED STATES PATENT OFFICE
CERTIFICATE OF CORRECTION

Patent No. 3,929,765　　　　　　　　　Dated December 30, 1975

Inventor(s) SUZUKI, ET AL.

It is certified that error appears in the above-identified patent and that said Letters Patent are hereby corrected as shown below:

Column 43, line 6, delete " R' ", insert -- $R'_2$ --

Column 43, line 11, after "halogen" insert -- , --

Column 44, Claim 5, line 1, delete "1-ethyl-3-N,N-p-", insert -- 1-ethyl-3-N,N-n- --

Signed and Sealed this twenty-seventh Day of April 1976

[SEAL]

Attest:

RUTH C. MASON
Attesting Officer

C. MARSHALL DANN
Commissioner of Patents and Trademarks